(12) United States Patent
Khoshnevis et al.

(10) Patent No.: US 8,543,867 B2
(45) Date of Patent: Sep. 24, 2013

(54) TRANSMISSION OF ACKNOWLEDGEMENT AND NEGATIVE ACKNOWLEDGEMENT IN A WIRELESS COMMUNICATION SYSTEM

(75) Inventors: Ahmad Khoshnevis, Portland, OR (US); Lizhong Zheng, Lexington, MA (US); John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 579 days.

(21) Appl. No.: 12/753,421

(22) Filed: Apr. 2, 2010

(65) Prior Publication Data

US 2011/0246840 A1 Oct. 6, 2011

(51) Int. Cl.
G06F 11/00 (2006.01)

(52) U.S. Cl.
USPC ............................ 714/47.2; 714/749; 714/748

(58) Field of Classification Search
None
See application file for complete search history.

(56) References Cited

U.S. PATENT DOCUMENTS

| | | | | |
|---|---|---|---|---|
| 6,658,619 B1 * | 12/2003 | Chen | | 714/748 |
| 7,636,328 B2 | 12/2009 | Teague et al. | | |
| 7,929,491 B2 * | 4/2011 | Lim et al. | | 370/328 |
| 8,134,940 B2 * | 3/2012 | Torsner et al. | | 370/280 |
| 2004/0008794 A1 * | 1/2004 | McClellan | | 375/260 |
| 2006/0048034 A1 * | 3/2006 | Cho | | 714/749 |
| 2006/0153155 A1 | 7/2006 | Jacobsen et al. | | |
| 2010/0177741 A1 * | 7/2010 | Zhang et al. | | 370/335 |
| 2010/0238975 A1 | 9/2010 | Nakao et al. | | |
| 2011/0283157 A1 * | 11/2011 | Yang et al. | | 714/749 |
| 2012/0106408 A1 * | 5/2012 | Papasakellariou et al. | | 370/280 |

FOREIGN PATENT DOCUMENTS

| | | |
|---|---|---|
| WO | 2006/022484 | 3/2006 |
| WO | 2009/057284 | 5/2009 |

OTHER PUBLICATIONS

International Search Report issued for International Patent Application No. PCT/JP2011/058670 on Jul. 5, 2011.
3GPP TS 36.213 V8.6.0, "Evolved Universal Terrestrial Radio Access (E-UTRA); Physical Layer Procedures (Release 8)," Mar. 2009.
3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.
3GPP TS 36.211 V9.0.0, "Evolved Universal Terrestrial Radio Access (E-UTRA); Physical Channels and Modulation (Release 9)," Dec. 2009.
3GPP TS 36.321 V8.5.0, "Evolved Universal Terrestrial Radio Access (E-UTRA) Medium Access Control (MAC) Protocol Specification (Release 8)," Mar. 2009.
3GPP TS 36.212 V9.0.0, "Evolved Universal Terrestrial Radio Access (E-UTRA); Multiplexing and Channel Coding (Release 9)," Dec. 2009.
Sharp, "Solution to PHICH Resource Collision," R1-101372, Feb. 22, 2010.

* cited by examiner

*Primary Examiner* — Christopher McCarthy
(74) *Attorney, Agent, or Firm* — Austin Rapp & Hardman

(57) ABSTRACT

A communication device configured for transmission of Acknowledgement and Negative Acknowledgement (ACK/NACK) is described. The communication device includes a processor and instructions stored in memory. The communication device determines one or more thresholds based on a size of one or more code words and generates a compressed ACK/NACK sequence. The compressed ACK/NACK sequence identifies one or more correctly received code words and one or more incorrectly received code words if the number of incorrectly received code words is less than the threshold. If the number of incorrectly received code words is greater than the threshold, the compressed ACK/NACK sequence indicates that all of the one or more code words were incorrectly received.

49 Claims, 14 Drawing Sheets

U.S. 8,543,867 B2

TRANSMISSION OF ACKNOWLEDGEMENT AND NEGATIVE ACKNOWLEDGEMENT IN A WIRELESS COMMUNICATION SYSTEM

TECHNICAL FIELD

The present disclosure relates generally to communication systems. More specifically, the present disclosure relates to the transmission of acknowledgement and negative acknowledgement (ACK/NACK) in a wireless communication system.

BACKGROUND

Communication systems have become an important means by which many people worldwide have come to communicate. In particular, wireless communication systems have become practically ubiquitous in modern society. Many wireless communication systems include a multitude of wireless communication devices and base stations.

A wireless communication device, such as a cellular phone, may be used for voice and/or data communication over a wireless communication system. A base station is a fixed station (e.g., a wireless communication station that is installed at a fixed location) that communicates with wireless communication devices.

Wireless communication systems typically use one or more antennas to communicate over the air. For instance, wireless communication devices and base stations typically communicate by sending Radio Frequency (RF) signals to each other. The nature of wireless communication systems often causes difficulties in receiving and decoding signals. For example, noise from a number of sources may be added to a communication signal. The communication signal may also be subject to effects such as Doppler shift and free space attenuation. The noise and other effects may cause a received signal to be incorrectly decoded. Wireless communication systems often convey information about whether signals were correctly received and/or incorrectly received. As can be seen from this discussion, improved systems and methods that improve the efficiency of reporting correctly received and/or incorrectly received signals may be beneficial.

DETAILED DESCRIPTION

Figure 1:
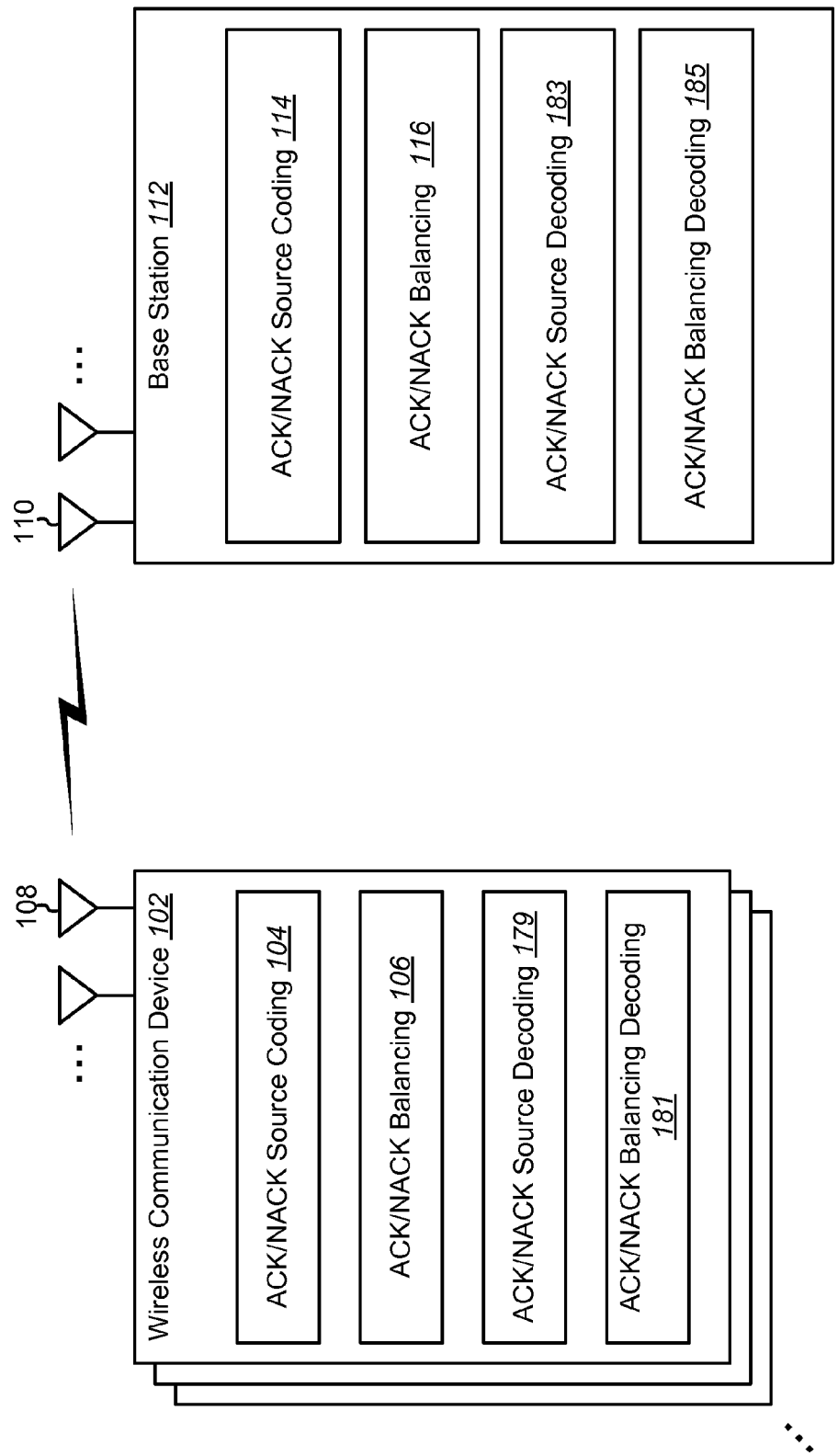
FIG. 1 is a block diagram illustrating one configuration of a wireless communication system wherein systems and methods for transmission of ACK/NACK in a wireless communication system may be implemented.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. A wireless communication device may be a cellular phone, a smart phone, a personal digital assistant (PDA), a laptop computer, a netbook, an e-reader, a wireless modem, etc. In 3GPP specifications, a wireless communication device is typically referred to as a user equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB), or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

A communication device configured for compression and transmission of Acknowledgement and Negative Acknowledgement (ACK/NACK) is disclosed. The communication device includes a processor and instructions stored in memory. The communication device determines one or more thresholds based on a size of one or more code words and generates a compressed ACK/NACK sequence. The compressed ACK/NACK sequence identifies one or more correctly received code words and one or more incorrectly received code words if the number of incorrectly received code words is less than the threshold. The compressed ACK/NACK sequence indicates that all of the one or more code words were incorrectly received if the number of incorrectly received code words is greater than the threshold.

The communication device may receive a signal including one or more code words. The communication device may transmit the compressed ACK/NACK sequence. The compressed ACK/NACK sequence may identify one or more correctly received code words and one or more incorrectly received code words if the number of incorrectly received code words is equal to the threshold. The compressed ACK/NACK sequence may indicate each incorrectly received code word and at least one correctly received code word as an incorrectly received code word if the number of incorrectly received code words is equal to the threshold.

The communication device may also partition an uncoded ACK/NACK sequence and generate a compressed ACK/NACK sequence for each partition. Each partition may use one of the one or more thresholds. Stronger code or unequal error protection may be applied to one or more ACK/NACK bits corresponding to one or more designated code words. The one or more designated code words may carry more sensitive information than other code words. The one or more designated code words may be larger than other code words.

The communication device may also communicate threshold information with at least one other communication device. The communication device may format the compressed ACK/NACK sequence such that an ACK/NACK bit is sent only at times corresponding to bit transitions. The status of only one code word may be reported for two or more code words by the communication device if a spectral correlation between channels corresponding to the two or more code words is greater than a spectral threshold. The status of only one code word may be reported for two or more code words by the communication device if a spatial correlation between channels corresponding to the two or more code words is greater than a spatial threshold.

The communication device may also channel code the compressed ACK/NACK sequence. The communication device may be a wireless communication device or a base station.

A communication device configured for balancing and transmission of Acknowledgement and Negative Acknowledgement (ACK/NACK) is also disclosed. The communication device includes a processor and instructions stored in memory. The communication device receives an ACK/NACK sequence, balances the ACK/NACK sequence and transmits the ACK/NACK sequence.

The ACK/NACK sequence may be balanced using a scrambling sequence that is specific to the communication device. The scrambling sequence may be a static scrambling sequence, a semi-dynamic scrambling sequence or a dynamic scrambling sequence.

The ACK/NACK sequence may be balanced using Gray coding. The Gray coding may be based on an algorithm or a look-up table. The ACK/NACK sequence may be balanced using distribution shaping using a non-linear transformation. The distribution shaping may be based on an algorithm or a look-up table. The ACK/NACK sequence may be a compressed ACK/NACK sequence. The communication device may also channel code the ACK/NACK sequence.

A method for compression and transmission of Acknowledgement and Negative Acknowledgement (ACK/NACK) is also disclosed. The method includes determining one or more thresholds based on a size of one or more code words and generating a compressed ACK/NACK sequence on a communication device. The compressed ACK/NACK sequence identifies one or more correctly received code words and one or more incorrectly received code words if the number of incorrectly received code words is less than the threshold. The compressed ACK/NACK sequence indicates that all of the one or more code words were incorrectly received if the number of incorrectly received code words is greater than the threshold.

A method for balancing and transmission of Acknowledgement and Negative Acknowledgement (ACK/NACK) is also disclosed. The method includes receiving an ACK/NACK sequence by a communication device, balancing the ACK/NACK sequence and transmitting the ACK/NACK sequence from the communication device.

A non-transitory tangible computer-readable medium for compression and transmission of Acknowledgement and Negative Acknowledgement (ACK/NACK) is disclosed. The computer-readable medium includes executable instructions for determining one or more thresholds based on a size of one or more code words and generating a compressed ACK/NACK sequence. The compressed ACK/NACK sequence identifies one or more correctly received code words and one or more incorrectly received code words if the number of incorrectly received code words is less than the threshold. The compressed ACK/NACK sequence indicates that all of the one or more code words were incorrectly received if the number of incorrectly received code words is greater than the threshold.

A non-transitory tangible computer-readable medium for balancing and transmission of Acknowledgement and Negative Acknowledgement (ACK/NACK) is also disclosed. The computer readable medium includes executable instructions for receiving an ACK/NACK sequence, balancing the ACK/NACK sequence and transmitting the ACK/NACK sequence.

In Release-10 of the 3GPP standard (e.g., LTE-Advanced) for cellular wireless communication, several channels (e.g., five) known as carrier components may be provisioned for transmission of information for both the uplink (e.g., signals from a wireless communication device to a base station) and downlink (e.g., signals from a base station to a wireless communication device). In addition, a number of spatial channels (e.g., two) may be available on each carrier component by using multiple antennas at a transmitter and a receiver. Therefore, multiple code words may be transmitted simultaneously. In one configuration, a maximum of ten code words (i.e., five channels×two code words per channel) can be transmitted simultaneously. For example, five times more code words may be transmitted according to Release-10 compared to Release-8.

Upon reception of the code words, the receiver may inform the transmitter regarding the successful or unsuccessful reception of each of the code words. This is typically accomplished by transmitting a one bit Acknowledgement/Negative Acknowledgement (ACK/NACK) for every received code word. If the code word is received successfully (e.g., correctly), an Acknowledgement (ACK) is transmitted (e.g., with the bit set to 1). Otherwise, a Negative Acknowledgement (NACK) is transmitted (e.g., with the bit set to 0). Thus, one bit per code word may be needed if each code word is acknowledged separately. For example, if ten code words are sent at a time, ten bits of ACK/NACK may be needed to separately acknowledge each code word. These ACK/NACK bits may be sent, for example, on a control channel or shared channel between communication devices (e.g., wireless communication device, base station, etc.). The systems and methods disclosed herein may provide a reduction in the number of transmitted ACK/NACK bits, which may be beneficial in a wireless communication system as control channel bandwidth may be a limited resource.

In wireless communication systems, the probability of a code word error may be set (e.g., designed to perform) at a particular operating point, given certain specified channel conditions. For example, the operating point of the LTE and LTE-Advanced standards is set such that the probability of a code word error may be 10% under mostly benign to moderately severe channel conditions in order for voice services to perform with a quality of service that does not appear uncomfortably distorted to typical human hearing. That is, 10% of the time, a receiver sends a Negative Acknowledgement (e.g., with the ACK/NACK bit set to 0) and 90% of the time a receiver sends an Acknowledgement (e.g., with the ACK/NACK bit set to 1). Therefore, an ACK/NACK sequence corresponding to several code words (e.g., ten bits corresponding to ten code words in the example above) sent from the receiver may have an imbalanced distribution of 1's and 0's. That is, there are more 1's in the sequence than 0's. When channel coding is used for such a sequence, the imbalance may cause a degraded performance in the channel code. The systems and methods disclosed herein may further provide techniques (e.g., a scrambling sequence specific to a communication device, Gray coding, etc.) to make an ACK/NACK bit stream more balanced.

It should be noted that as used herein, the general term "ACK/NACK sequence" may refer to an uncoded ACK/NACK sequence, compressed (or lossy-coded) ACK/NACK sequence, unbalanced ACK/NACK sequence, balanced ACK/NACK sequence, balanced compressed ACK/NACK sequence, a channel coded ACK/NACK sequence, or an ACK/NACK sequence in various stages of compression or balancing, for example. The term "channel coded ACK/NACK sequence" may be refer to an ACK/NACK sequence that has been channel coded, including uncoded, compressed, unbalanced, balanced and balanced compressed ACK/NACK sequences.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication system wherein systems and methods for transmission of ACK/NACK in a wireless communication system may be implemented. One or more wireless communication devices 102 may communicate with a base station 112. Examples of wireless communication devices include cellular phones, smart phones, e-readers, laptop computers, netbooks, etc. Examples of a base station include a cellular phone tower, an access point, etc. The wireless communication device 102 and the base station 112 may communicate, for example, by sending and receiving data and control signals to and from each other. In one configuration, the wireless communication device 102 includes one or more antennas 108 and the base station 112 includes one or more antennas 110.

The one or more wireless communication devices 102 may receive code words from the base station 112. A code word may be a binary representation of data (e.g., voice, control and/or other data). When a wireless communication device 102 successfully (e.g., correctly) receives a code word from the base station 112, for example, the wireless communication device 102 may generate an ACK corresponding to that code word (e.g., a bit set to 1). However, when the wireless communication device 102 unsuccessfully (e.g., incorrectly) receives a code word (e.g., the code word was lost or damaged), the wireless communication device 102 may generate a NACK corresponding to that code word (e.g., a bit set to 0). A sequence of ACKs and NACKs may be formed by putting the ACK/NACK bits of all of the code words in sequence. This series of ACK/NACK bits may be referred to as an uncoded ACK/NACK sequence.

The one or more wireless communication devices 102 may include an ACK/NACK source coding module 104 and/or an ACK/NACK balancing module 106. The ACK/NACK source coding module 104 may be a hardware and/or software module used to code an uncoded ACK/NACK sequence (e.g., sequence of ACK/NACK bits). The ACK/NACK source coding module 104 may compress the uncoded ACK/NACK sequence into a compressed or lossy-coded ACK/NACK sequence. The compressed or lossy-coded ACK/NACK sequence may be shorter (e.g., require fewer bits) than the uncoded ACK/NACK sequence. The compression performed by the ACK/NACK source coding module may also reduce the severity of an unbalance in the uncoded ACK/NACK sequence.

The balancing module 106 may be a hardware and/or software module used to balance an ACK/NACK sequence. For example, the balancing module 106 may balance an uncoded ACK/NACK sequence such that the number of 1's and 0's in the sequence are closer to equal. Alternatively, the compressed ACK/NACK sequence (generated by the ACK/NACK source coding module 104) may optionally be balanced by the ACK/NACK balancing module 106. For example, the ACK/NACK balancing module 106 may modify the compressed ACK/NACK sequence such that it has a more even distribution of 1's and 0's. That is, the ACK/NACK balancing module 106 may modify the compressed ACK/NACK sequence so that the number of 1's and the number of 0's in the sequence are closer to equal. The ACK/NACK balancing module 106 may thus generate a balanced ACK/NACK sequence or a balanced compressed ACK/NACK sequence.

It should be noted that the ACK/NACK source coding module 104 and the ACK/NACK balancing module 106 may be used independently or in combination. As discussed above, a compressed ACK/NACK sequence (generated by the ACK/NACK source coding module 104) may be optionally balanced by the ACK/NACK balancing module 106 in one configuration. In another configuration, however, the compressed ACK/NACK sequence may not be balanced. Furthermore, an uncoded ACK/NACK sequence may be balanced by the ACK/NACK balancing module 106 without any source coding or compression. Thus, a communication device may include one of an ACK/NACK source coding module 104, an ACK/NACK balancing module 106 or both 104, 106. Furthermore, a communication device may utilize one of an ACK/NACK source coding module 104, an ACK/NACK balancing module 106 or both 104, 106 at one time.

The ACK/NACK sequence may be transmitted. For example, the wireless communication device 102 may generate a balanced compressed ACK/NACK sequence (based on one or more received code words) and send it to the base station 112. The base station 112 may use an ACK/NACK balancing decoding module 185 in order to decode or interpret a balanced ACK/NACK sequence or balanced compressed ACK/NACK sequence. In other words, the base station 112 may decode the balanced ACK/NACK sequence or balanced compressed ACK/NACK sequence to remove the balancing and thus obtain an ACK/NACK sequence (e.g., uncoded ACK/NACK sequence, compressed ACK/NACK sequence, etc.).

The base station 112 may also use an ACK/NACK source decoding module 183 to interpret, decode or "decompress" a compressed ACK/NACK sequence and thus obtain an ACK/NACK sequence. Because the compression performed is lossy compression, the ACK/NACK source decoding module 183 may recover the original ACK/NACK sequence for some cases. In other cases, the source decoding module 183 may recover a representation that is not the original ACK/NACK sequence but that indicates at least the incorrectly received code words in addition to some code words that were possibly received correctly. The base station 112 may then retransmit code words that the ACK/NACK sequence indicates were received incorrectly.

As illustrated in FIG. 1, an ACK/NACK source coding module 114 and/or an ACK/NACK balancing module 116 may be included on the base station 112. In other words, an ACK/NACK source coding module 104, 114 and an ACK/NACK balancing module 106, 116 may be implemented on one or more wireless communication devices 102 and/or on the base station 112. Additionally or alternatively, the wireless communication device 102 may include an ACK/NACK balancing decoding module 181 and/or an ACK/NACK source decoding module 179. In other words, an ACK/NACK balancing decoding module 181, 185 and an ACK/NACK source decoding module 179, 183 may be implemented on one or more wireless communication devices 102 and/or on the base station 112. In one configuration, some or all aspects of ACK/NACK source decoding 179, 183 and/or ACK/NACK balancing decoding 181, 185 may occur as part of channel decoding. For example, a channel decoder on a communication device 102, 112 receiving an ACK/NACK sequence may perform Gray decoding, distribution de-shaping and/or descrambling.

Figure 2:
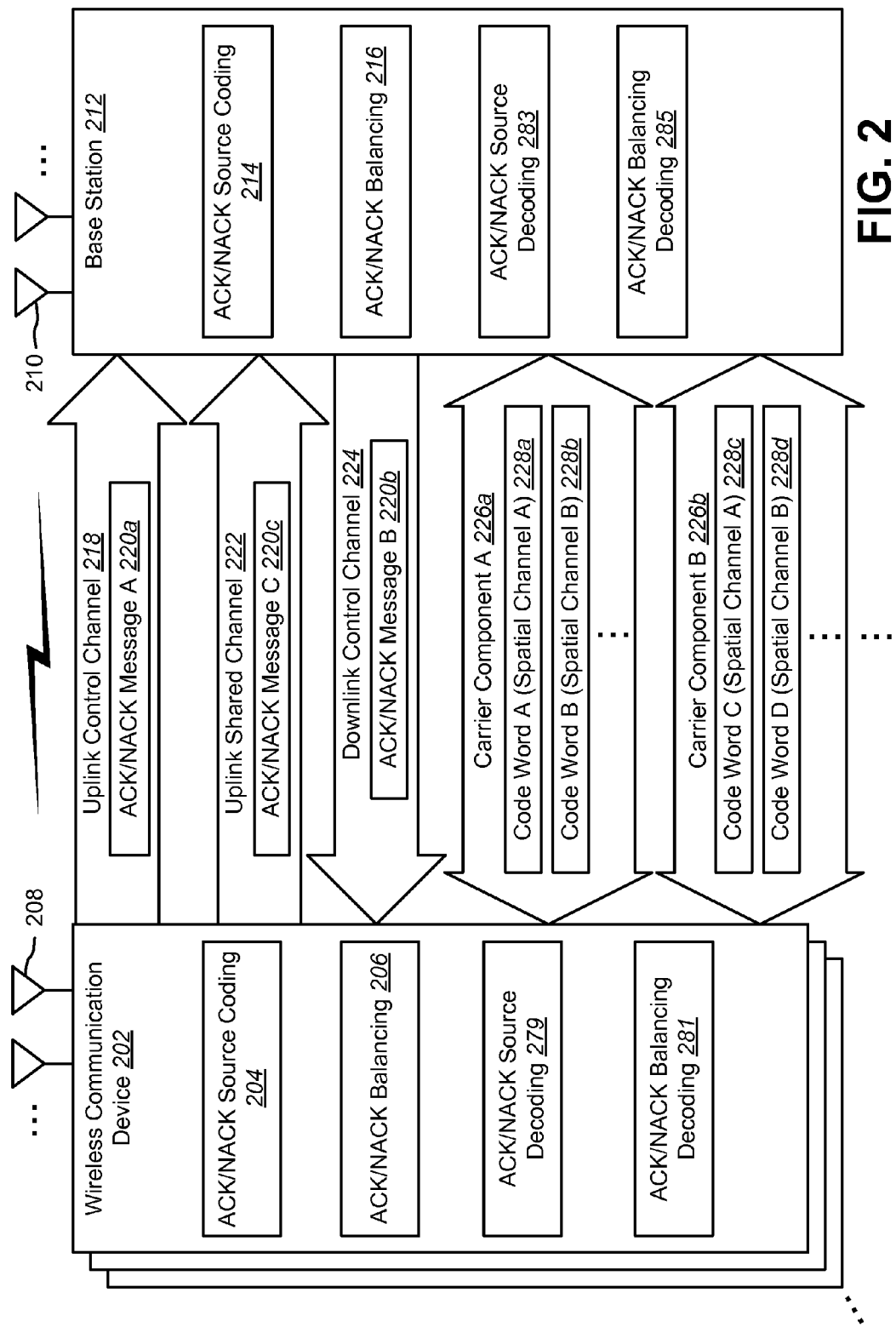
FIG. 2 is a block diagram illustrating more detail of one configuration of a wireless communication system wherein systems and methods for transmission of ACK/NACK in a wireless communication system may be implemented.

FIG. 2 is a block diagram illustrating more detail of one configuration of a wireless communication system wherein systems and methods for transmission of ACK/NACK in a wireless communication system may be implemented. One or more wireless communication devices 202 may communicate with a base station 212 using one or more antennas 208. The base station 212 may also communicate with the one or more wireless communication devices 202 using one or more antennas 210.

The wireless communication device 202 and the base station 212 may communicate with each other using channels and/or component carriers. For example, a wireless communication device 202 uses an uplink control channel 218 to send control information to the base station 212. One example of an uplink control channel is a Physical Uplink Control Channel (PUCCH) pursuant to 3GPP specifications. In one configuration, the uplink control channel 218 is assigned to one particular wireless communication device 202. In other words, each wireless communication device 202 may use a separate uplink control channel 218 for sending control information to the base station 212.

An uplink shared channel 222 may also be used in common by one or more wireless communication devices 202. The uplink shared channel 222 may be used to send ACK/NACK bits or sequences (e.g., ACK/NACK message C 220c), control or other information to the base station 212 from one or more wireless communication devices 202. One example of an uplink shared channel 222 is a Physical Uplink Shared Channel (PUSCH) pursuant to 3GPP specifications. The base station 212 may use a downlink control channel 224 to send control information to one or more wireless communication devices 202. One example of a downlink control channel 224 is a Physical Downlink Control Channel (PDCCH) pursuant to 3GPP specifications.

One or more carrier components 226 may be used to transmit data between the one or more wireless communication devices 202 and the base station 212. Carrier components 226 may be communication channels that are separated in the frequency domain. In one configuration, several carrier components 226 comprise a data channel that is used to send and/or receive voice and other data. For example, voice data and other data may be represented as code words 228 carried on the carrier components 226. Each carrier component 226 may also be used to transmit separate code words using multiple antenna 208, 210 techniques. For example, multiple spatial channels may be formed by using multiple antennas 208, 210. In this way, multiple code words 228 may be sent on each carrier component 226 using different spatial channels. For example, code word A 228a is sent on carrier component A 226a using spatial channel A, code word B 228b is sent on carrier component A 226a using spatial channel B, code word C 228c is sent on carrier component B 226b using spatial channel A and code word D 228d is sent on carrier component B 226b using spatial channel B.

The wireless communication device 202 may include an ACK/NACK source coding module 204 and/or an ACK/NACK balancing module 206. The wireless communication device 202 may receive one or more code words 228 sent from the base station 212 on one or more carrier components 226. The wireless communication device 202 may generate an uncoded ACK/NACK sequence indicating which of the one or more code words 228 was/were successfully (e.g., correctly) and/or unsuccessfully (e.g., incorrectly) received. The ACK/NACK source coding module 204 may use the uncoded ACK/NACK sequence to generate a compressed (e.g., lossy-coded) ACK/NACK sequence, a balanced ACK/NACK sequence (which may be balanced by the ACK/NACK balancing module 206) or a balanced compressed ACK/NACK sequence, for example. In one configuration, the compressed and/or balanced ACK/NACK sequence is channel coded and sent to the base station 212 as ACK/NACK message A 220a using the uplink control channel 218. The base station 212 may use an ACK/NACK balancing decoding module 285 to remove balancing from the ACK/NACK sequence (e.g., that was received as part of ACK/NACK message A 220a). The base station 212 may also use an ACK/NACK source decoding module 283 to decode or decompress the compressed ACK/NACK sequence to obtain a decompressed ACK/NACK sequence. The base station 212 may retransmit any code words 228 that the ACK/NACK sequence indicates were incorrectly received. Thus, the base station 212 may retransmit any code words 228 that ACK/NACK message A 220*a* indicates were unsuccessfully received by the wireless communication device 202.

The base station 212 may alternatively or additionally include an ACK/NACK source coding module 214 and/or an ACK/NACK balancing module 216. These modules 214, 216 may function similarly to those 204, 206 described above in connection with the wireless communication device 202. However, ACK/NACK message B 220*b* may be generated based on code words that were successfully (e.g., correctly) or unsuccessfully (e.g., incorrectly) received by the base station 212 from the wireless communication device 202. ACK/NACK message B 220*b* may be sent using the downlink control channel 224. The wireless communication device 202 may retransmit those unsuccessfully (e.g., incorrectly) received code words (i.e., by the base station 212) as indicated by ACK/NACK message B 220*b*.

The wireless communication device 202 may alternatively or additionally include an ACK/NACK source decoding module 279 and/or an ACK/NACK balancing decoding module 281. These modules 279, 281 may function similarly to those 283, 285 described above in connection with the base station 212. However, the ACK/NACK balancing decoding module 281 and/or the ACK/NACK source decoding module 279 may be used to interpret or decode a balanced and/or compressed ACK/NACK sequence sent from the base station 212 (e.g., in ACK/NACK message B 220*b*).

A more specific example of the configuration illustrated in FIG. 2 is given hereafter. In the downlink channel(s) specified in 3GPP Release-10 (e.g., LTE-Advanced), five carrier components 226 (i.e., five communication channels that are separated in the frequency domain) can be used for transmission of data to the wireless communication device (e.g., User Equipment (UE)) 202. In addition, two separate code words (e.g., code words 228*a-b*, 228*c-d*, etc.) may be transmitted concurrently (at approximately the same time) on each carrier component (e.g., carrier component A 226*a*, carrier component B 226*b*, etc.) 226 using multiple antenna 208, 210 techniques. Thus, a total of ten code words 228 may be concurrently transmitted to the wireless communication device (e.g., UE) 202.

One ACK/NACK bit is associated with each code word 228, which indicates whether the code word 228 was received correctly or incorrectly. For example, if a code word 228 is received correctly (i.e., successfully), the value of the corresponding ACK/NACK bit is 1, otherwise it is set to 0. All of the bits corresponding to the ten transmitted code words 228 create a sequence of ACK/NACK bits, referred to as an uncoded ACK/NACK sequence. As discussed above, the uncoded ACK/NACK sequence may be compressed to generate a lossy-coded ACK/NACK sequence. ACK/NACK source coding 204 techniques that may reduce the length of the uncoded ACK/NACK sequence are described in greater detail below.

An ACK/NACK sequence may be channel coded prior to transmission. Some examples of channel coding include a repetition code, which can be achieved by simply repeating the ACK/NACK sequence or spreading the ACK/NACK sequence using spreading codes (or sequences) used in Code Division Multiple Access (CDMA) schemes. More complex channel coding schemes such as Reed-Muller codes may be used to channel code the ACK/NACK sequence. The resultant bit stream may be referred to as a channel-coded ACK/NACK sequence. That is, an ACK/NACK sequence may be channel coded to produce an ACK/NACK message 220 (e.g., ACK/NACK message A 220*a*) for transmission.

The adaptive coding and modulation scheme in LTE and LTE-Advanced are designed such that the code word 228 error rate may be around 10%. That is, about 10% of the time a code word 228 is received erroneously and the other 90% of the time the code word is received correctly. As a result, in an ACK/NACK sequence there may be more 1's (i.e., corresponding to correctly received code words 228) than 0's. The imbalance in the ACK/NACK sequence degrades the performance of the channel-coded ACK/NACK sequence. Thus, the ACK/NACK balancing module 206 may be used in order to balance the ACK/NACK sequence (e.g., in terms of number of 0's and 1's). For example, the ACK/NACK balancing module 206 may use a scrambler sequence, a Gray code and/or a non-linear mapping to balance the ACK/NACK sequence.

Figure 3:
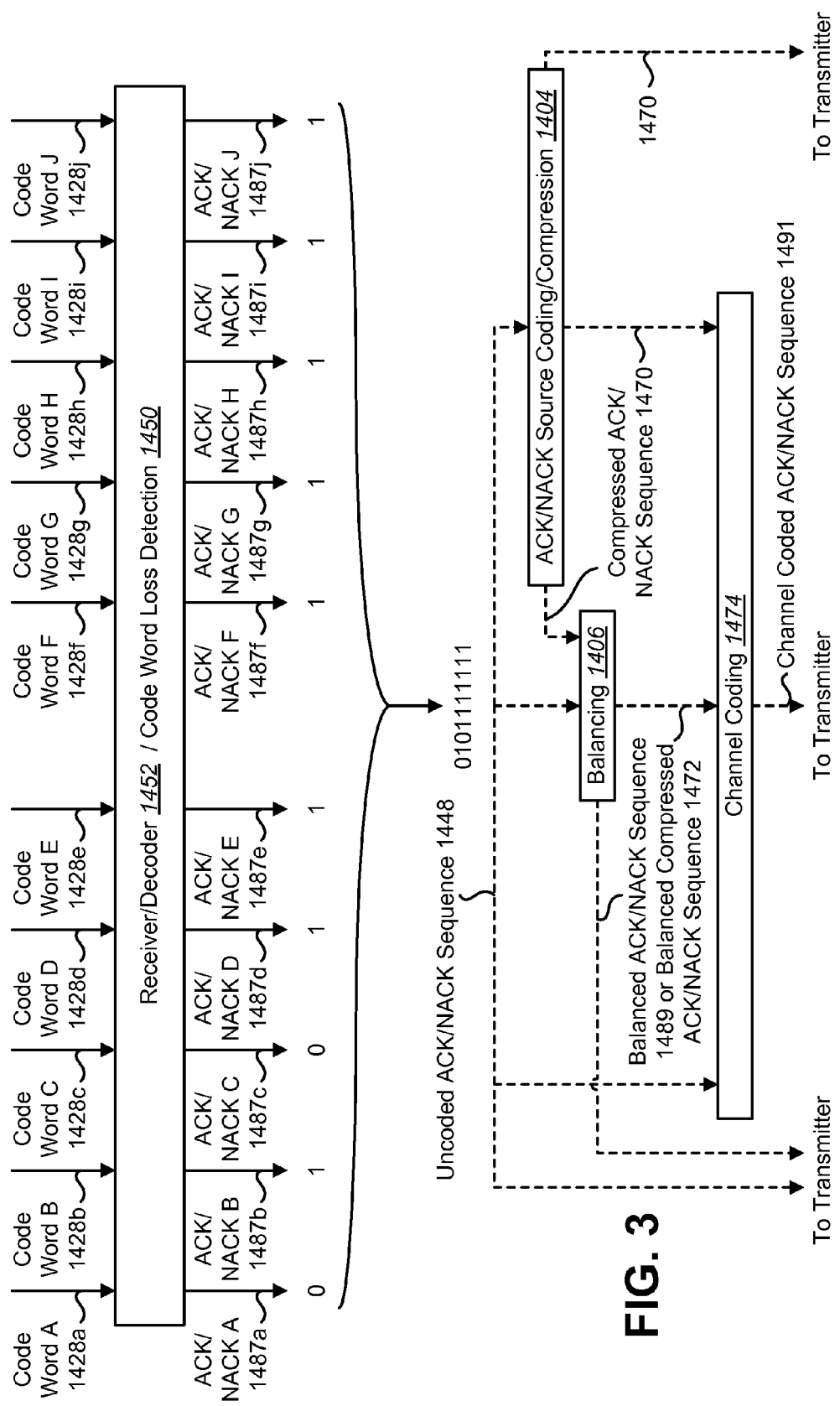
FIG. 3 is a block diagram illustrating an example of several possible configurations of systems and methods for transmission of acknowledgement and negative acknowledgement in a wireless communication system.

FIG. 3 is a block diagram illustrating an example of several possible configurations of systems and methods for transmission of acknowledgement and negative acknowledgement in a wireless communication system. In this example, ten code words 1428*a-j* are received by a receiver/decoder module 1452. It should be noted that the systems and methods disclosed herein are not limited to ten code words 1428*a-j*, but may utilize any number of code words 228. The receiver/decoder module 1452 and/or a code word loss detection module 1450 may generate ACK/NACK bits 1487*a-j* based on whether the code words 1428*a-j* were received or decoded correctly. In this example, the receiver/decoder module 1452 and/or a code word loss detection module 1450 detect that code word A 1428*a* and code word C 1428*c* were received incorrectly, while the remainder of the code words 1428*b*, 1428*d-j* were received correctly. The receiver/decoder module 1452 and/or a code word loss detection module 1450 generates ACK/NACK A 1487*a* as 0, ACK/NACK C 1487*c* as 0, and the remainder of the ACK/NACK bits 1487*b*, 1487*d-j* as 1's. In this example, the ten ACK/NACK bits 1487*a-j* are combined to form an uncoded ACK/NACK sequence 1448 of 0101111111. In this case, the uncoded ACK/NACK sequence 1448 of 0101111111 may be "unbalanced" since it has many more 1's than 0's.

FIG. 3 illustrates several paths that may be taken by an ACK/NACK sequence. Two of the several paths illustrated in FIG. 3 are given for clarity. On one path, the uncoded ACK/NACK sequence 1448 may be sent to a transmitter for transmission. On another path, the uncoded ACK/NACK sequence 1448 may be channel coded using a channel coding module 1474 and sent using a transmitter.

Several possible configurations of the systems and methods are described as follows. In one configuration, the uncoded ACK/NACK sequence 1448 (which may also be unbalanced) may be balanced by the balancing module 1406. This balanced ACK/NACK sequence 1489 may be sent to the transmitter to be transmitted with a repetition code. This repetition code may simply be where two or more copies of the balanced ACK/NACK sequence 1489 are transmitted by occupying different communication device (e.g., wireless communication device 102, base station 112) resources. Examples of communication device resources include time resources, frequency resources and spatial or antenna resources.

In another configuration, the balanced ACK/NACK sequence 1489 may be input into a channel coding module 1474. The channel coding module 1474 may channel code an ACK/NACK sequence to produce a channel coded ACK/NACK sequence 1491 in preparation for transmission. One example of a channel code that may be used is a Reed-Muller code. Because the balanced ACK/NACK sequence 1489 may be more balanced than the uncoded ACK/NACK sequence

1448, the performance of the channel coding may be increased. That is, the channel coding performance may be increased due to a more balanced use of the code in comparison to the case where the uncoded unbalanced ACK/NACK sequence 1448 is channel coded 1474 without balancing 1406.

In another configuration, the uncoded ACK/NACK sequence 1448 may be source coded or compressed using an ACK/NACK source coding/compression module 1404. The ACK/NACK source coding/compression module 104 may use the uncoded ACK/NACK sequence 1448 to produce a compressed ACK/NACK sequence 1470. The compressed ACK/NACK sequence 1470 may be input into the balancing module 1406. In this case, a balanced (lossy) compressed ACK/NACK sequence 1472 may be generated. In some configurations, the ACK/NACK sequence compression 1404 and balancing 1406 may be lumped together. The balanced compressed ACK/NACK sequence 1472 may be sent to the transmitter without channel coding 1474. Alternatively, the balanced compressed ACK/NACK sequence 1472 may be channel coded using the channel coding module 1474 and sent to a transmitter.

In another configuration, the compressed ACK/NACK sequence 1470 may be input into the channel coding module 1474 without balancing. That is, the output of the lossy compression module 1404 may be encoded by the channel coding module 1474 and sent to a transmitter.

In another configuration, the compressed ACK/NACK sequence 1470 is sent to the transmitter. In this case, coding schemes such as repetition coding schemes may be used. In a repetition coding scheme, two or more copies of the same compressed ACK/NACK sequence 1470 may be transmitted using two or more different communication device resources (e.g., time, frequency or space/antenna). For example, two copies of an ACK/NACK sequence may be transmitted at two different times, on different frequencies or using different spatial channels.

Figure 4:
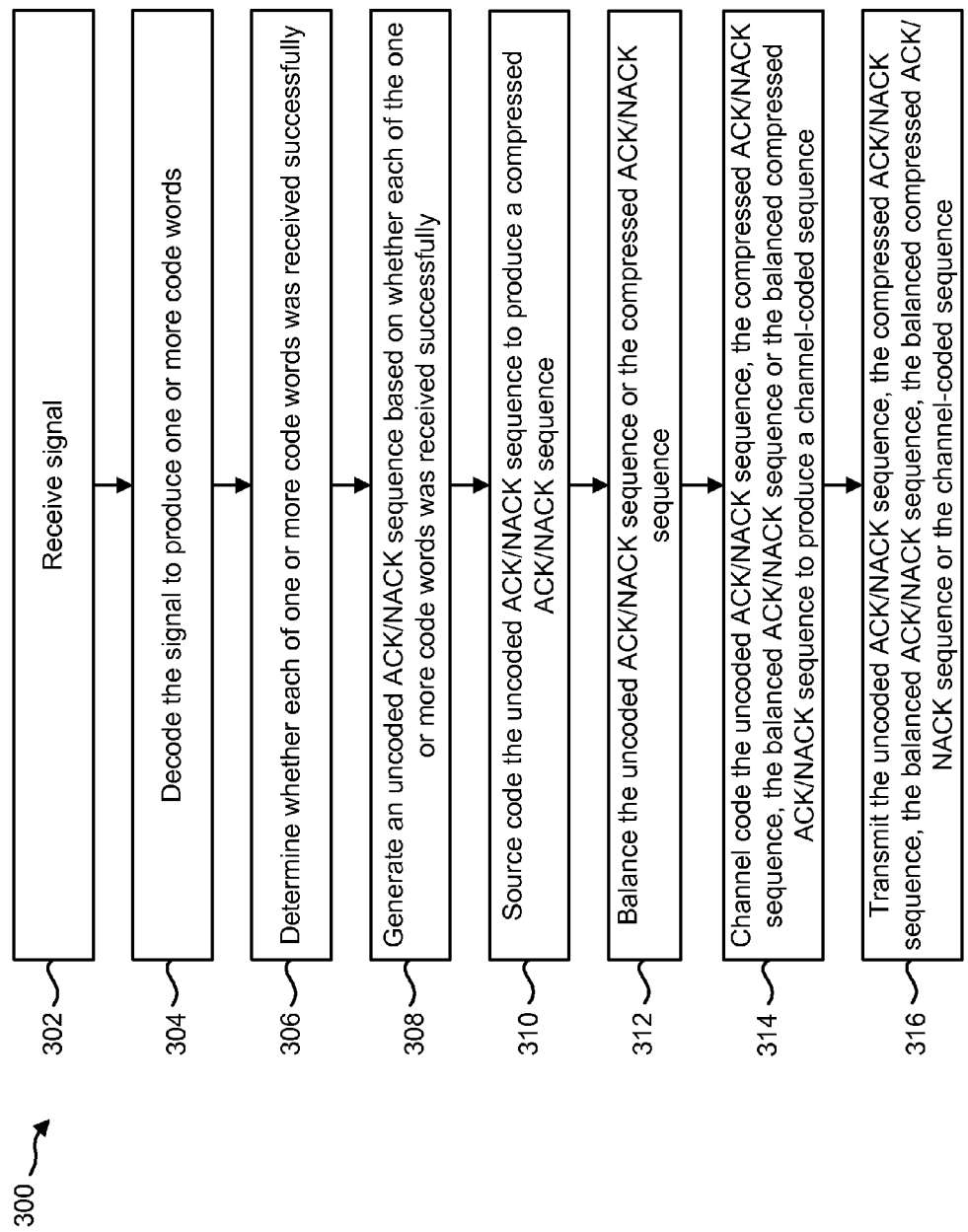
FIG. 4 is a flow diagram illustrating one configuration of a method for transmission of ACK/NACK in a wireless communication system.

FIG. 4 is a flow diagram illustrating one configuration of a method 300 for transmission of ACK/NACK in a wireless communication system. The communication device may receive 302 one or more code words. For example, a wireless communication device 102 may receive 302 a signal (e.g., containing one or more code words 228) from a base station 112. The communication device may decode 304 the signal to produce one or more code words.

The communication device may determine 306 whether each of the one or more code words 228 was received successfully. For example, the communication device may utilize an error detection code to determine 306 which of the one or more code words 228 was/were successfully and/or unsuccessfully received. For example, a Cyclic Redundancy Check (CRC) may be used to determine 306 which code words 228 were correctly or incorrectly received. Other approaches known in the art may be used to determine 306 correct/incorrect reception of code words 228. The communication device may generate 308 an uncoded ACK/NACK sequence based on whether each of the one or more code words 228 was received successfully. In one configuration, the communication device generates an ACK/NACK bit corresponding to each code word 228. If a code word 228 was successfully received, its 228 corresponding ACK/NACK bit is set to 1. Otherwise (if the code word 228 was unsuccessfully received), its 228 corresponding ACK/NACK bit is set to 0. The uncoded ACK/NACK sequence may comprise a group of ACK/NACK bits.

The communication device may source code 310 the uncoded ACK/NACK sequence to produce a compressed ACK/NACK sequence. The source coding 310 disclosed herein may be a lossy source-coding. Hence, the uncoded ACK/NACK sequence may be source coded 310 by the communication device to produce a compressed (e.g., lossy source-coded) ACK/NACK sequence. More detail regarding lossy source coding 310 is given below, particularly in connection with FIGS. 5, 6, 7, 8, 9 and 11. The communication device may balance 312 the compressed ACK/NACK sequence 1470 to produce a balanced compressed ACK/NACK sequence 1472. Alternatively, the communication device may balance the uncoded ACK/NACK sequence 1448 to produce a balanced ACK/NACK sequence 1489. More detail regarding ACK/NACK balancing 312 is given below, particularly in connection with FIG. 12.

The communication device may channel code 314 the ACK/NACK sequence (e.g., uncoded ACK/NACK sequence 1448, balanced ACK/NACK sequence 1489, compressed ACK/NACK sequence 1470 or balanced compressed ACK/NACK sequence 1472) to produce a channel-coded ACK/NACK sequence 1491. The channel-coded ACK/NACK sequence 1491 may be transmitted 316 by the communication device. The channel-coded ACK/NACK sequence 1491 may be received and decoded by another communication device, which may retransmit one or more unsuccessfully received code words 228 as indicated by the ACK/NACK sequence. As discussed above, the channel coded ACK/NACK sequence 1491 (e.g., ACK/NACK message 220) may be transmitted on a control channel 218, 224. The method 300 illustrated in FIG. 4 may be repeated for additional received signals and/or code words 228.

Figure 5:
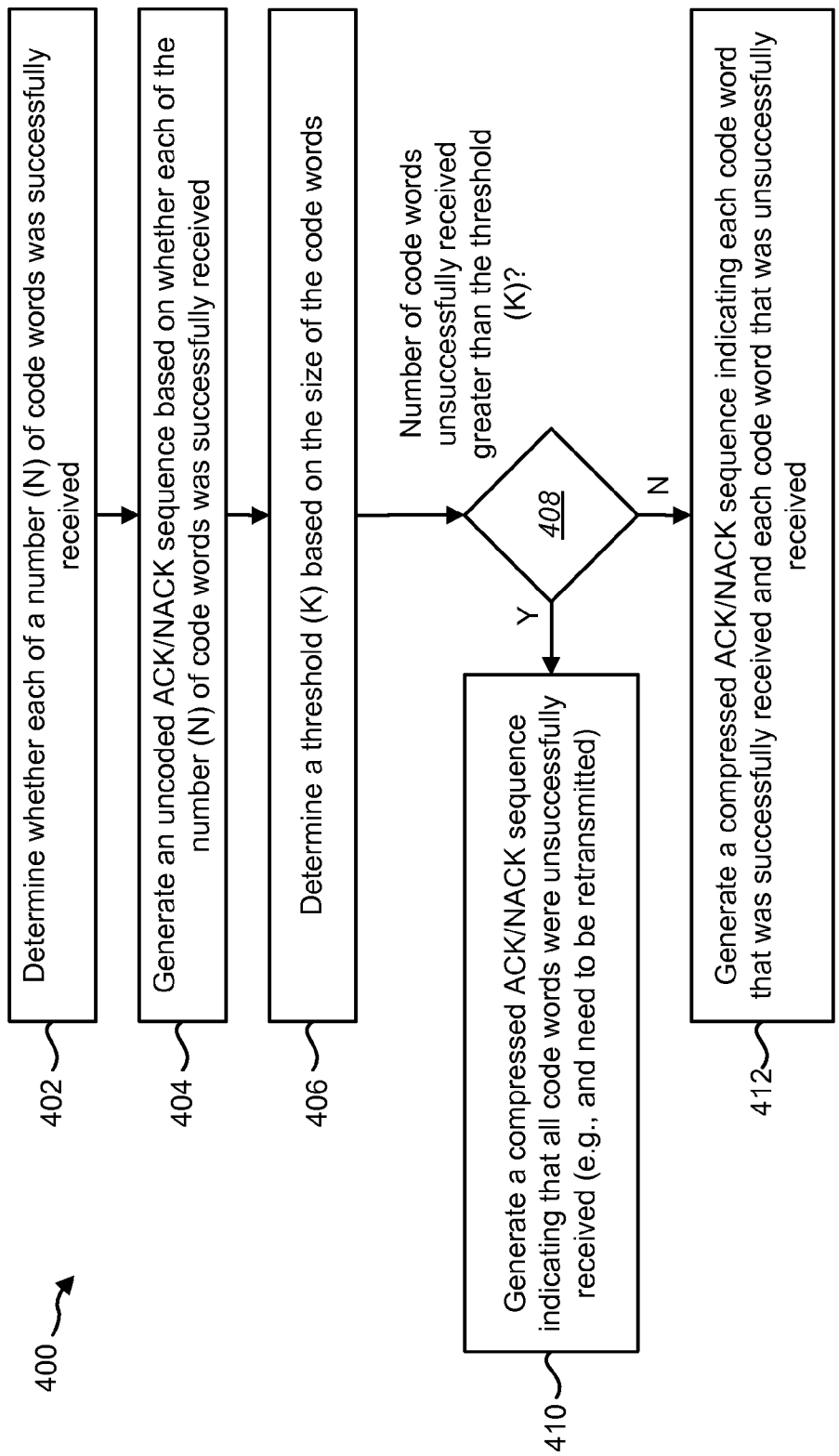
FIG. 5 is a flow diagram illustrating a more specific configuration of a method for transmission of ACK/NACK in a wireless communication system.

FIG. 5 is a flow diagram illustrating one more specific configuration of a method 400 for transmission of ACK/NACK in a wireless communication system. The communication device may determine 402 whether each of a number (e.g., N) of code words 228 was successfully (e.g., correctly) received. For example, the communication device may use an error detecting code to detect whether each of the code words 228 was successfully received or not. The communication device may generate 404 an uncoded ACK/NACK sequence 1448 based on whether each of the code words 228 was successfully received. As described above, a group of bits each corresponding to a code word 228 may indicate which of the code words 228 was successfully received or unsuccessfully received.

The communication device may determine 406 a threshold (e.g., K) based on the size of the code words 228. Alternatively, the communication device may determine 406 the threshold based on data received from another communication device. For example, a wireless communication device 102 may receive one or more code words 228 and determine 406 the threshold based on the size of those code words 228. Alternatively, the base station 112 may send data to the wireless communication device 102 (e.g., a threshold) that the wireless communication device 102 may use to determine 406 a threshold.

The communication device may then determine 408 whether the number of code words 228 unsuccessfully (e.g., incorrectly) received is greater than the threshold. For example, the communication device may use the uncoded ACK/NACK sequence to determine the number of code words 228 that were unsuccessfully received and compare it to the threshold.

If the number of unsuccessfully (e.g., incorrectly) received code words 228 is greater than the threshold, the communication device may generate 410 a compressed (e.g., lossy-coded) ACK/NACK sequence 1470 indicating that all of the code words 228 corresponding to the uncoded ACK/NACK sequence were unsuccessfully received. That is, the compressed ACK/NACK sequence 1470 may indicate that all of the code words 228 corresponding to the uncoded ACK/NACK sequence 1448 may need to be retransmitted.

If the number of unsuccessfully received code words 228 is not greater than the threshold (i.e., less than or equal to the threshold), the communication device may generate 412 a compressed (e.g., lossy-coded) ACK/NACK sequence 1470 indicating each code word 228 that was successfully received and each code word 228 that was unsuccessfully received. That is, if the number of unsuccessfully received code words 228 is less than or equal to the threshold, the compressed ACK/NACK sequence 1470 will indicate which of the code words 228 (i.e., corresponding to the uncoded ACK/NACK sequence) were unsuccessfully received and may need to be retransmitted. The method 400 illustrated in FIG. 4 may be repeated for additional received code words 228.

One example of the compression or coding technique described in connection to FIG. 5 is given hereafter. Assume that ten code words 228 are transmitted on downlink component carriers 226 from a base station 112 to a wireless communication device 102. At the receiver (e.g., the wireless communication device 102), one ACK/NACK bit 1487 is generated for each received code word 228. The communication device determines 402 whether each code word 228 was received correctly. If a code word 228 is received correctly (i.e., successfully), the value of the corresponding ACK/NACK 1487 bit is 1, otherwise it is 0 (e.g., for an unsuccessfully received code word). All of the ten ACK/NACK 1487 bits are combined to create a sequence (e.g., S) of ACK/NACK bits. Hence, an uncoded ACK/NACK sequence 1448 is generated 404.

In other ACK/NACK schemes, the uncoded ACK/NACK sequence 1448 may be sent back to the transmitter (e.g., the base station 112) to inform it about the status of the received code words 228 at the receiver (e.g., the wireless communication device 102). If a code word 228 was not received correctly, the transmitter (e.g., the base station 112) resends the corresponding code word 228.

However, the length of the uncoded ACK/NACK sequence (S) is the same as the number of code words 228. Instead of sending the uncoded ACK/NACK sequence (S) 1448, a compressed ACK/NACK sequence (e.g., S') 1470 may be transmitted, having a length smaller than the uncoded ACK/NACK sequence (S) 1448. That is, lossy source coding may be applied to the uncoded ACK/NACK sequence (S) 1448. For example, instead of sending the uncoded ACK/NACK sequence 1448 with a length of ten, a shorter ACK/NACK sequence (e.g., with a length of six or seven) may be transmitted. By sending the shorter compressed ACK/NACK sequence (S') 1470, not all of the combinations of bits in the uncoded ACK/NACK sequence (S) can be covered and incomplete information about the status of the code words 228 may be received (e.g., by the transmitting communication device). This is why the source coding technique disclosed herein may be described as "lossy-coding." However, by designing a proper length for the compressed ACK/NACK sequence (S'), system overhead may be reduced and higher performance achieved.

In lossy ACK/NACK source coding, a threshold (K) is determined 406. More detail on determining 406 the threshold (K) is given below. For purposes of this example, assume that K=2. Once the threshold (K) is determined 406, the communication device determines 408 if more than K code words were unsuccessfully (e.g., incorrectly) received. If more than K code words 228 are in error (i.e., their corresponding uncoded ACK/NACK bits are 0) at the receiver (e.g., the wireless communication device 102), an ACK/NACK message 220 is sent back to the transmitter (e.g., the base station 112) requesting retransmission of all of the code words 228. That is, the ACK/NACK message 220 may include a compressed ACK/NACK sequence 1470 indicating that all of the code words 228 were unsuccessfully received (e.g., as generated 410 by the communication device).

Using this approach, multiple combinations of ACK/NACK bits in the uncoded ACK/NACK sequence (S) 1448 may be represented with a single sequence in the compressed ACK/NACK sequence (S') 1470. Thus, the uncoded ACK/NACK sequence (S) 1448 may be "compressed," where the compressed ACK/NACK sequence (S') 1470 has a shorter length in bits compared to the uncoded ACK/NACK sequence (S) 1448. In the example with ten code words where K=2, there is 1 combination of bits in the uncoded ACK/NACK sequence (S) 1448 indicating that all of the code words 228 were successfully received (e.g., 1111111111). This is illustrated in Equation (1):

$$\binom{10}{0} = 1 \tag{1}$$

There are also ten combinations of bits in the uncoded ACK/NACK sequence (S) 1448 indicating that one code word was unsuccessfully received (e.g., 0111111111, 1011111111, 1101111111, 1110111111, 1111011111, 1111101111, 1111110111, 1111111011, 1111111101 and 1111111110). This is illustrated in Equation (2):

$$\binom{10}{1} = 10 \tag{2}$$

Furthermore, there are 45 combinations of bits in the uncoded ACK/NACK sequence (S) 1448 indicating that two code words 228 were unsuccessfully received (e.g., 0011111111, 0101111111, 0110111111, etc.). This is illustrated in Equation (3):

$$\binom{10}{2} = 45 \tag{3}$$

According to the lossy-coding or compression herein, there is only one case where there are more than two unsuccessfully (e.g., incorrectly) received code words. Thus, by sending an ACK/NACK message 220 indicating that all code words 228 were unsuccessfully received when more than two code words are unsuccessfully received, the number of combinations is reduced from $10^2=1024$ (e.g., assuming 10 bits in the uncoded ACK/NACK sequence S) to (1+10+45+1)=57, which are needed to be represented by the compressed ACK/NACK sequence (S'). In order to represent the 57 cases, the length of the compressed ACK/NACK sequence (S') 1470 needs to be $\text{Log}_2(57)=5.8$ bits. With the constraint of accepting only an integer number for the length of the compressed ACK/NACK sequence (S') 1470, the length of the compressed ACK/NACK sequence (S') 1470 would be six bits in this example.

By using the compressed ACK/NACK sequence (S') 1470 when the number of unsuccessfully received code words 228 is greater than the threshold (K) (e.g., where K=2 in the example), all of the code words 228 are retransmitted even though some of them may have been successfully received. The retransmission of the successfully received code words 228 may be considered overhead caused by compressing the uncoded ACK/NACK sequence 1448. By sending fewer bits on the uplink (e.g., the uplink control channel 218), control information and non-data transmissions (e.g., "overhead") are reduced. However, additional overhead is added by retransmitting successfully received code words 228. Thus, several factors may be used to determine 406 the threshold (K): the length of code words (i.e., in bits), code word error rate and the amount of overhead reduction (e.g., the difference between the length of the compressed ACK/NACK sequence (S') and the uncoded ACK/NACK sequence (S)).

The threshold (K) may be determined 406 by selecting a threshold (K) when the overhead reduction (e.g., the number of bits saved in the transmission of the compressed ACK/NACK 1470 instead of the uncoded ACK/NACK 1448 on the uplink control channel 218) is greater than or equal to the number of additional overhead bits caused by the retransmission of successfully received code words (e.g., on one or more carrier components 226). Thus, the threshold (K) may be determined 406 based on the size of the code words 228. In one configuration, the reduction of overhead (e.g., in the uplink control channel 218) may be valued more than the added overhead (e.g., in the downlink carrier components 226). In this case, a weighted tradeoff between the overhead reduction (e.g., in the uplink control channel 218) and the overhead addition (e.g., in the downlink carrier components 226) may be used to determine the threshold.

Determination of a threshold (K) may be implemented in several ways. For example, a threshold (K) may be set and fixed for a desirable amount of compression. In this case, the compression on a control channel 218, 224 may be highly valued and the overhead may be considered "tolerable." The threshold (K) may also be computed dynamically or semi-dynamically. For dynamic computation, the threshold (K) may be computed repeatedly by a communication device (e.g., wireless communication device 102, base station 112, etc.). Alternatively, the threshold (K) may be computed semi-dynamically (e.g., by a communication device) where a computed threshold value (K) may be used for a period of time and then updated periodically. As yet another alternative, the threshold (K) may be determined through the use of a look-up table on a communication device (e.g., wireless communication device 102, base station 112, etc.).

One example of how a threshold (K) may be computed follows. One way for computing the threshold (K) is by considering the tradeoff between the savings in the uplink transmission and the overhead in the downlink transmission. The savings in the uplink is caused by compression (e.g., in ACK/NACK message 220 size on the uplink control channel 218 or uplink shared channel 222). For instance, ACK/NACK message 220 size is reduced by sending fewer bits than ten (e.g., 6, 7, 8, etc.). The overhead in the downlink is caused by the retransmission of correctly received (or decoded) code words 228 on downlink carrier components 226. For example, if there are more than K errors (assume K=3), then all code words 228 are NACKed. For the sake of example, assume that four code words 228 out of ten transmitted code words 228 are in error or received incorrectly. By sending NACKs for all code words 228, the transmitter retransmits all ten code words 228 once again, including the six code words that were successfully decoded in the first transmission. This extra transmission of the correctly received code words 228 is considered downlink overhead. Note that the amount of savings in the uplink and downlink overhead varies with the threshold (K).

The value of the threshold (K) may be determined, for example, when Equation (4) is satisfied.

$$\text{Savings in Uplink} = \alpha - (\text{Downlink Overhead}) \quad (4)$$

In Equation (4), $\alpha$ is a real number factor between 0 and 1 that can control the importance of load reduction on a control channel 218 versus overhead addition on the downlink carrier components 226. The downlink overhead may be computed for a 10 bit ACK/NACK sequence as illustrated by Equation (5).

$$\text{Overhead}(K) = \sum_{i=K+1}^{10} Pr(\#error = i) \cdot \left( \sum_{correctly\_received\_code\_words} code\_word\_size \right) \quad (5)$$

The number of compressed bits (ANBits) may be computed, for example, as illustrated in Equation (6).

$$ANBits(K) = \left\lceil Log_2 \left[ \sum_{i=0}^{K} \binom{10}{i} + 1 \right] \right\rceil \quad (6)$$

Therefore, the amount of savings by compression may be computed, for example, as illustrated in Equation (7).

$$\text{Savings}(K) = 10 - ANBits(K) \quad (7)$$

Listing (1) illustrates a procedure (in pseudo-code) for determining the threshold (K).

---
Listing (1)
---
```
flag = 'false'
K = 1
while (flag is 'false')
    compute Overhead(K)
    compute Savings(K)
    if (Savings(K) ≧ α · Overhead(K))
        then store K and set flag = 'true'
    K = K + 1
return to while
```
---

It should be noted that the assumption of a transmission of ten code words 228 used in the examples herein is based on a scenario in accordance with the 3GPP Release-10 standard (i.e., LTE-Advanced). In this scenario, five carrier components 226 (e.g., five transmission bands each with up to a 20 megahertz (MHz) bandwidth) are provisioned for a downlink. Furthermore, two code words 228 are transmitted in each carrier component 226 using multiple antenna 108, 110 techniques. It should also be noted that the systems and methods disclosed herein are not limited to the numbers presented in this example and may be generalized to an arbitrary number of transmitted code words 228.

Figure 6:
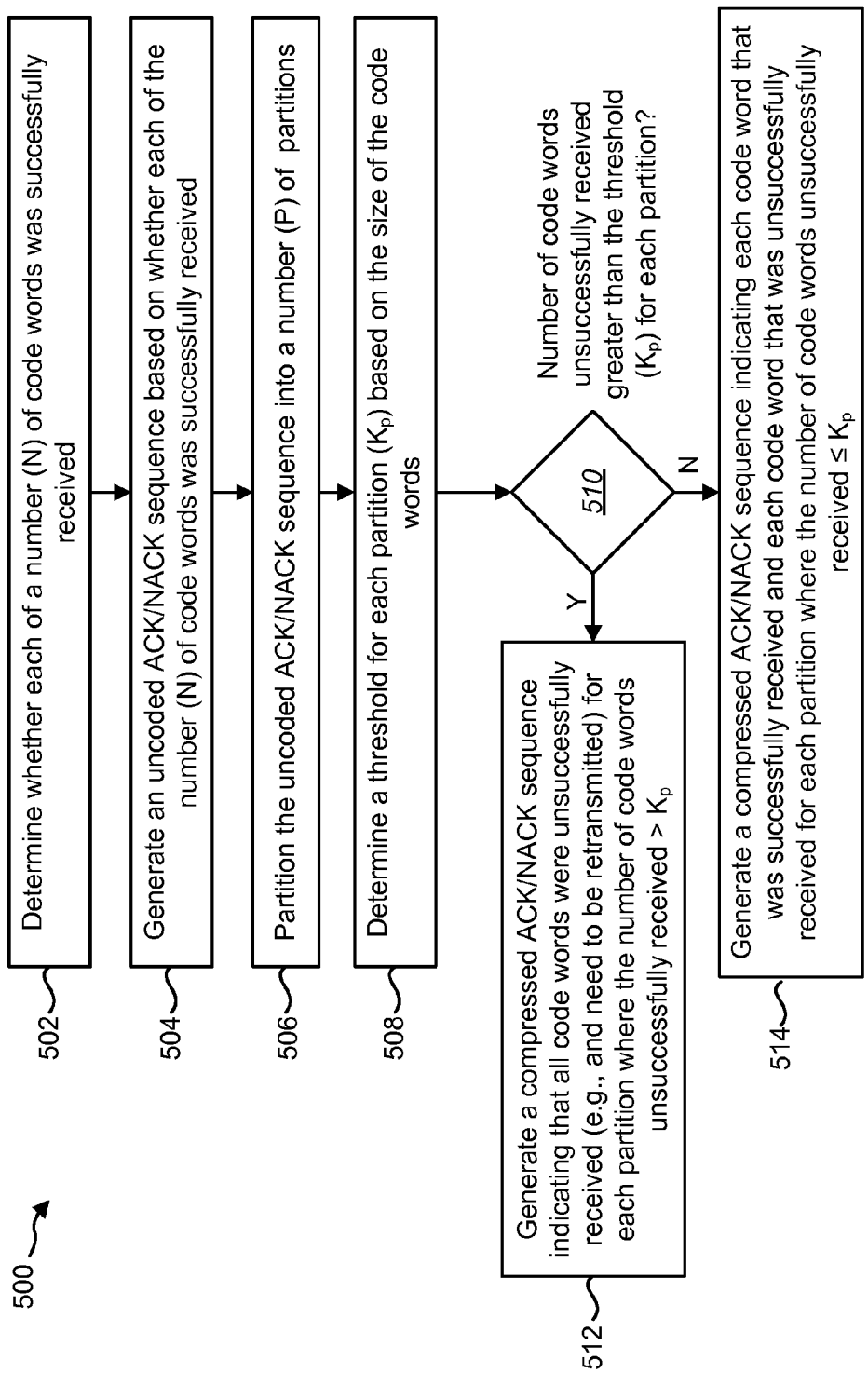
FIG. 6 is a flow diagram illustrating another more specific configuration of a method for transmission of ACK/NACK in a wireless communication system.

FIG. 6 is a flow diagram illustrating another configuration of a method 500 for transmission of ACK/NACK in a wireless communication system. The communication device may determine 502 whether each of a number (N) of code words 228 was successfully received. The communication device may generate 504 an uncoded ACK/NACK sequence 1448 based on which of the number (N) of code words 228 was/were successfully or unsuccessfully received.

The communication device may partition 506 the uncoded ACK/NACK sequence 1448 into a number (P) of partitions. More specifically, compressing or lossy-coding the uncoded ACK/NACK sequence (S) 1448 may not be limited to compressing or encoding the whole uncoded ACK/NACK sequence (S) 1448. The algorithm may be applied to any subset of the uncoded ACK/NACK sequence (S) 1448. That is, the uncoded ACK/NACK sequence (S) 1448 may be partitioned 506. Compression or lossy ACK/NACK source coding may be applied to each partition with a different threshold ($K_p$) assigned to each partition. That is, the communication device may determine 508 a threshold ($K_p$) for each of the number (P) of partitions. This determination 508 may be based on the size of the code words 228 and/or partitions in a similar fashion to the determination 406 described above in connection with FIG. 5.

Each partition threshold ($K_p$) may be determined 508 based on data local to the communication device or based on data received from another communication device. For example, a communication device may use a locally determined code word 228 size (e.g., partition size), error rate and/or overhead reduction (e.g., for partitions) to determine 508 each partition threshold ($K_p$). Alternatively, the communication device may receive this data or one or more partition thresholds ($K_p$) from another communication device (e.g., a wireless communication device 102 may receive it from a base station 112). The communication device may determine 508 its partition thresholds ($K_p$) based on the received data or partition thresholds ($K_p$).

The communication device may determine 510 whether the number of unsuccessfully received code words 228 is greater than the partition threshold ($K_p$) for each partition. If the number of unsuccessfully (e.g., incorrectly) received code words 228 is greater than the partition threshold ($K_p$) for a particular partition, the communication device may generate 512 a compressed ACK/NACK sequence ($S_p'$) 1470 indicating that all of the code words 228 were unsuccessfully received (and may need to be retransmitted) for that partition. If the number of unsuccessfully received code words 228 is not greater than the partition threshold ($K_p$) for a particular partition, the communication device may generate 514 a compressed ACK/NACK sequence ($S_p'$) 1470 indicating each code word 228 that was successfully (e.g., correctly) received and each code 228 word that was unsuccessfully received for that partition. It should also be noted that the method 500 illustrated in FIG. 6 may be repeated for additional received code words 228.

Figure 7:
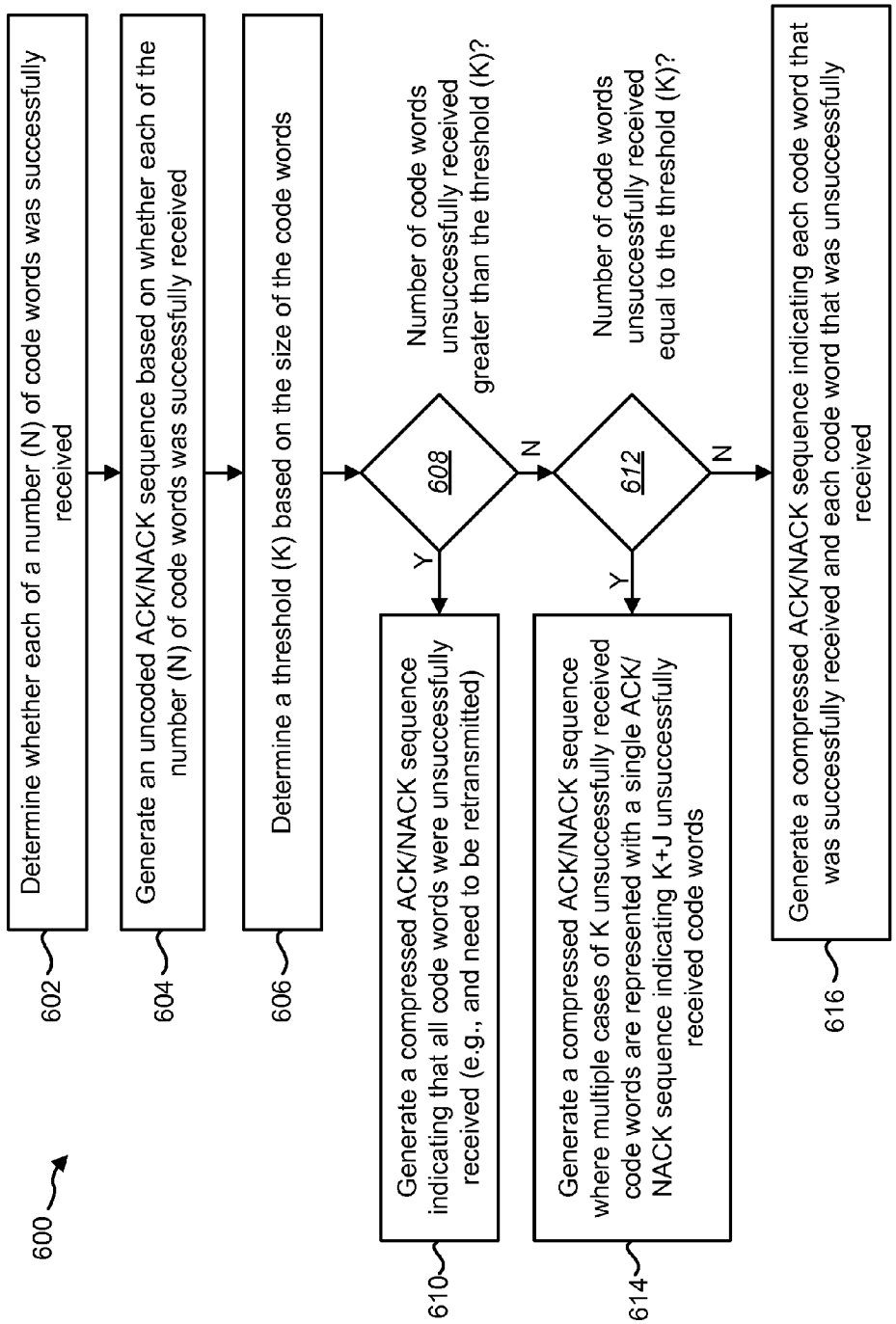
FIG. 7 is a flow diagram illustrating yet another more specific configuration of a method for transmission of ACK/NACK in a wireless communication system.

FIG. 7 is a flow diagram illustrating another configuration of a method 600 for transmission of ACK/NACK in a wireless communication system. A communication device may determine 602 whether each of a number (N) code words 228 was successfully (e.g., correctly) received. The communication device may generate 604 an uncoded ACK/NACK sequence 1448 based on which of the code words 228 was/were successfully or unsuccessfully (e.g., incorrectly) received. The communication device may also determine 606 a threshold (K) based on the size of the code words 228.

The communication device may determine 608 whether the number of unsuccessfully received code words 228 is greater than the threshold (K). If the number of unsuccessfully received code words 228 is greater than the threshold (K), the communication device may generate 610 a compressed ACK/NACK sequence 1470 indicating that all of the code words 228 were unsuccessfully (e.g., incorrectly) received (e.g., requesting a retransmission of all of the code words 228 corresponding to the uncoded ACK/NACK sequence 1448). If the number of unsuccessfully received code words 228 is not greater than the threshold (K), the communication device may determine 612 whether the number of unsuccessfully received code words 228 is equal to the threshold (K). If the number of unsuccessfully received code words 228 is not equal to the threshold (e.g., it is less than the threshold (K)), the communication device may generate 616 a compressed ACK/NACK sequence 1470 indicating each code word 228 that was successfully received and each code word 228 that was unsuccessfully received.

If the number of unsuccessfully received code words 228 is equal to the threshold (K), the communication device may generate 614 a compressed ACK/NACK sequence 1470 where multiple cases of a number (e.g., K) of unsuccessfully received code words 228 are represented with a single ACK/NACK sequence indicating a greater number (e.g., K+J) of unsuccessfully received code words 228. This approach is described in greater detail using an example below. It should also be noted that the method 600 illustrated in FIG. 7 may be repeated for additional received code words 228.

According to the earlier example discussed in connection with FIG. 5 (i.e., with a threshold of two (K=2)), the cases where two code words 228 were unsuccessfully received $$\left(\text{e.g.,} \binom{10}{2} = 45\right)$$

contributed the largest number of cases. That is, in the above example (e.g., with a threshold of two (K=2)), 45 combinations out of a total 57 combinations were allocated for covering cases in which two code words 228 were unsuccessfully received.

For a threshold of three (e.g., K=3), the total number of combinations is 177 (e.g., 1+10+45+120+1=177) out of which 120 cases are for 3 unsuccessfully received code words 228. In order to add more compression, one or more additional code word 228 retransmissions may be allowed. For example, consider a case in which four NACKs are reported (e.g., in an uncoded ACK/NACK sequence): S=0000111111. This sequence may represent the following combinations in which three code words 228 are in error: $S_1$=0001111111, $S_2$=0010111111, $S_3$=0100111111 and $S_4$=1000111111. There is one extra NACK in S=0000111111 compared to each of the cases with three errors shown $S_{1-4}$. If four combinations ($S_{1-4}$) are represented by a single sequence (S), then the total number of combinations with three errors can be reduced from 120 cases to 120/4=30 cases. Thus, the total number of combinations may be reduced from 177 cases (e.g., 1+10+45+120+1=177) needing eight bits for representation to 87 cases (e.g., 1+10+45+30+1=87) needing seven bits for representation. In this example, one bit is saved by compressing the uncoded ACK/NACK sequence at the price of one extra retransmission when there are three errors (e.g., with K=3).

Although the example was given for ease in explanation, the systems and methods disclosed herein are not limited to representing three-error sequences with four-error sequences. That is, this approach can be generalized to cases in which sequences with K NACKs are represented by sequences with K+J NACKs (e.g., where the uncoded ACK/NACK sequence has a number of (K+J) "0" bits with the remainder being "1" bits).

Figure 8:
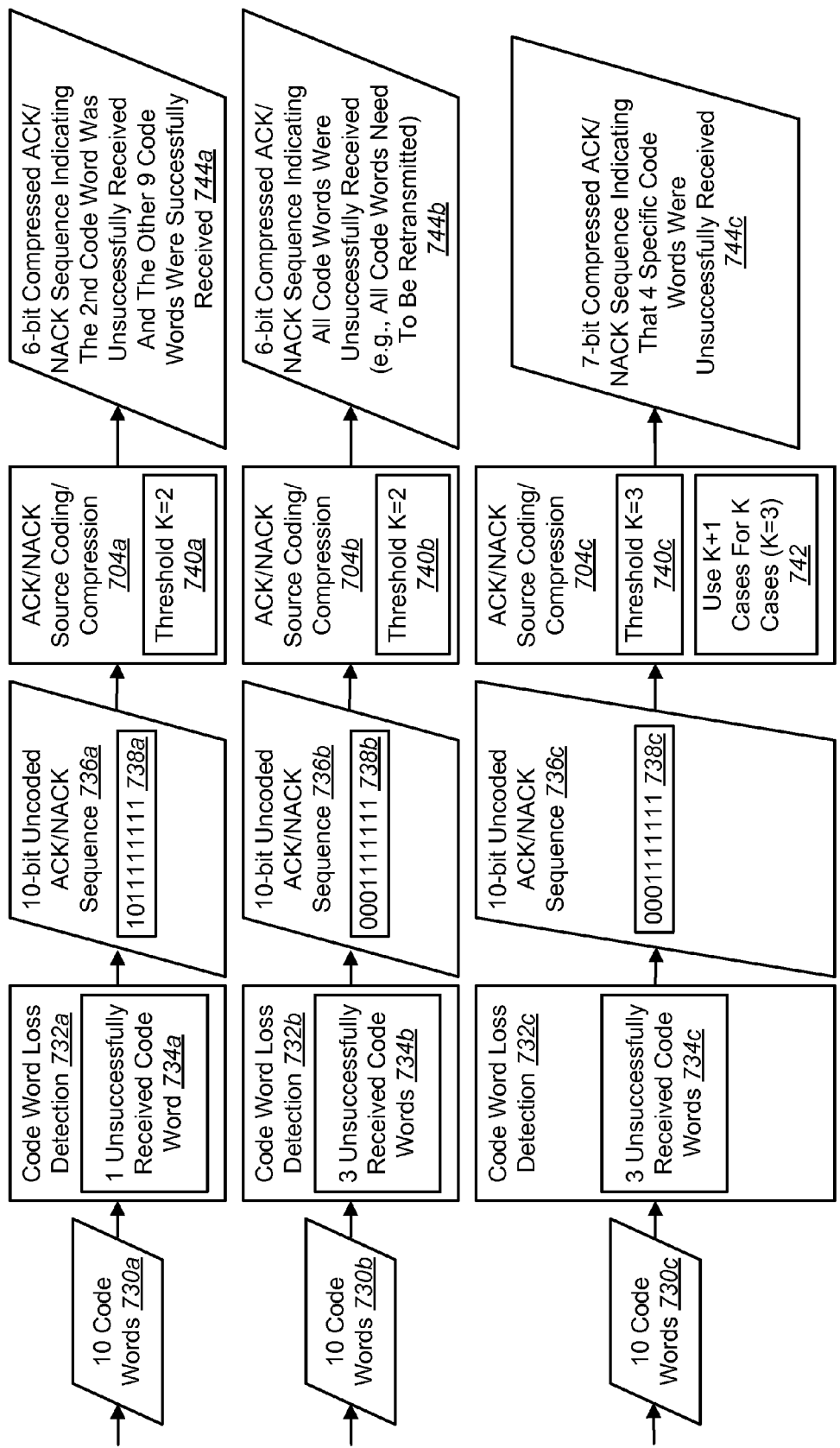
FIG. 8 is a block diagram illustrating three examples of ACK/NACK source coding or compression.

FIG. 8 is a block diagram illustrating three examples of ACK/NACK source coding or compression. As discussed above, a communication device (e.g., a wireless communication device 102, base station 112, etc.) may obtain one or more code words 228 from a received signal. In the first example illustrated in FIG. 8, ten code words 730a are obtained. A code word loss detection module 732a determines 402 which of the ten code words 730a were successfully or unsuccessfully received.

In this example, the code word loss detection module 732a detects one unsuccessfully received code word 734a. The communication device generates 404 a ten bit uncoded ACK/NACK sequence 736a. In this example, the ten bit uncoded ACK/NACK sequence S=1011111111 738a. Assume that an ACK/NACK source coding module 704a has determined 406 a threshold K=2 740a. The ACK/NACK source coding module 704a determines 408 that the number of unsuccessfully received code words 228 is not greater than the threshold K=2 740a (i.e., 1≦2). The ACK/NACK source coding module 704a then generates 412 a six bit compressed ACK/NACK sequence 744a indicating that the second code word of the ten code words 730a was unsuccessfully received. The six bit compressed ACK/NACK sequence 744a also indicates that the first code word and the third through tenth code words were successfully received. For the ten bit uncoded ACK/NACK sequence S=1011111111 738a, one example of a six bit compressed ACK/NACK sequence S'=000010 744a. More examples of possible ten bit uncoded ACK/NACK sequences 736 and corresponding six bit compressed ACK/NACK sequences 744 are illustrated below in Table (1) (e.g., where K=2).

TABLE (1)

| Uncoded ACK/NACK Sequence | | | | | | | | | | Index | Compressed ACK/NACK Sequence |
|---|---|---|---|---|---|---|---|---|---|---|---|
| No Errors | | | | | | | | | | | |
| 1 | 1 | 1 | 1 | 1 | 1 | 1 | 1 | 1 | 1 | 1 | 000000 |
| 1 Error | | | | | | | | | | | |
| 0 | 1 | 1 | 1 | 1 | 1 | 1 | 1 | 1 | 1 | 2 | 000001 |
| 1 | 0 | 1 | 1 | 1 | 1 | 1 | 1 | 1 | 1 | 3 | 000010 |
| 1 | 1 | 0 | 1 | 1 | 1 | 1 | 1 | 1 | 1 | 4 | 000011 |
| 1 | 1 | 1 | 0 | 1 | 1 | 1 | 1 | 1 | 1 | 5 | 000100 |
| 1 | 1 | 1 | 1 | 0 | 1 | 1 | 1 | 1 | 1 | 6 | 000101 |
| 1 | 1 | 1 | 1 | 1 | 0 | 1 | 1 | 1 | 1 | 7 | 000110 |
| 1 | 1 | 1 | 1 | 1 | 1 | 0 | 1 | 1 | 1 | 8 | 000111 |
| 1 | 1 | 1 | 1 | 1 | 1 | 1 | 0 | 1 | 1 | 9 | 001000 |
| 1 | 1 | 1 | 1 | 1 | 1 | 1 | 1 | 0 | 1 | 10 | 001001 |
| 1 | 1 | 1 | 1 | 1 | 1 | 1 | 1 | 1 | 0 | 11 | 001010 |
| 2 Errors | | | | | | | | | | | |
| 0 | 0 | 1 | 1 | 1 | 1 | 1 | 1 | 1 | 1 | 12 | 001011 |
| 0 | 1 | 0 | 1 | 1 | 1 | 1 | 1 | 1 | 1 | 13 | 001100 |
| 0 | 1 | 1 | 0 | 1 | 1 | 1 | 1 | 1 | 1 | 14 | 001101 |
| 0 | 1 | 1 | 1 | 0 | 1 | 1 | 1 | 1 | 1 | 15 | 001110 |
| 0 | 1 | 1 | 1 | 1 | 0 | 1 | 1 | 1 | 1 | 16 | 001111 |
| 0 | 1 | 1 | 1 | 1 | 1 | 0 | 1 | 1 | 1 | 17 | 010000 |
| 0 | 1 | 1 | 1 | 1 | 1 | 1 | 0 | 1 | 1 | 18 | 010001 |
| 0 | 1 | 1 | 1 | 1 | 1 | 1 | 1 | 0 | 1 | 19 | 010010 |
| 0 | 1 | 1 | 1 | 1 | 1 | 1 | 1 | 1 | 0 | 20 | 010011 |
| 1 | 0 | 0 | 1 | 1 | 1 | 1 | 1 | 1 | 1 | 21 | 010100 |
| 1 | 0 | 1 | 0 | 1 | 1 | 1 | 1 | 1 | 1 | 22 | 010101 |
| 1 | 0 | 1 | 1 | 0 | 1 | 1 | 1 | 1 | 1 | 23 | 010110 |
| 1 | 0 | 1 | 1 | 1 | 0 | 1 | 1 | 1 | 1 | 24 | 010111 |
| 1 | 0 | 1 | 1 | 1 | 1 | 0 | 1 | 1 | 1 | 25 | 011000 |
| 1 | 0 | 1 | 1 | 1 | 1 | 1 | 0 | 1 | 1 | 26 | 011001 |
| 1 | 0 | 1 | 1 | 1 | 1 | 1 | 1 | 0 | 1 | 27 | 011010 |
| 1 | 0 | 1 | 1 | 1 | 1 | 1 | 1 | 1 | 0 | 28 | 011011 |
| 1 | 1 | 0 | 0 | 1 | 1 | 1 | 1 | 1 | 1 | 29 | 011100 |
| 1 | 1 | 0 | 1 | 0 | 1 | 1 | 1 | 1 | 1 | 30 | 011101 |
| 1 | 1 | 0 | 1 | 1 | 0 | 1 | 1 | 1 | 1 | 31 | 011110 |
| 1 | 1 | 0 | 1 | 1 | 1 | 0 | 1 | 1 | 1 | 32 | 011111 |
| 1 | 1 | 0 | 1 | 1 | 1 | 1 | 0 | 1 | 1 | 33 | 100000 |
| 1 | 1 | 0 | 1 | 1 | 1 | 1 | 1 | 0 | 1 | 34 | 100001 |

TABLE (1)-continued

| Uncoded ACK/NACK Sequence | | | | | | | | | | Index | Compressed ACK/NACK Sequence |
|---|---|---|---|---|---|---|---|---|---|---|---|
| 1 | 1 | 0 | 1 | 1 | 1 | 1 | 1 | 1 | 0 | 35 | 100010 |
| 1 | 1 | 1 | 0 | 0 | 1 | 1 | 1 | 1 | 1 | 36 | 100011 |
| 1 | 1 | 1 | 0 | 1 | 0 | 1 | 1 | 1 | 1 | 37 | 100100 |
| 1 | 1 | 1 | 0 | 1 | 1 | 0 | 1 | 1 | 1 | 38 | 100101 |
| 1 | 1 | 1 | 0 | 1 | 1 | 1 | 0 | 1 | 1 | 39 | 001100 |
| 1 | 1 | 1 | 0 | 1 | 1 | 1 | 1 | 0 | 1 | 40 | 100111 |
| 1 | 1 | 1 | 0 | 1 | 1 | 1 | 1 | 1 | 0 | 41 | 101000 |
| 1 | 1 | 1 | 1 | 0 | 0 | 1 | 1 | 1 | 1 | 42 | 101001 |
| 1 | 1 | 1 | 1 | 0 | 1 | 0 | 1 | 1 | 1 | 43 | 101010 |
| 1 | 1 | 1 | 1 | 0 | 1 | 1 | 0 | 1 | 1 | 44 | 101011 |
| 1 | 1 | 1 | 1 | 0 | 1 | 1 | 1 | 0 | 1 | 45 | 101100 |
| 1 | 1 | 1 | 1 | 0 | 1 | 1 | 1 | 1 | 0 | 46 | 101101 |
| 1 | 1 | 1 | 1 | 1 | 0 | 0 | 1 | 1 | 1 | 47 | 101110 |
| 1 | 1 | 1 | 1 | 1 | 0 | 1 | 0 | 1 | 1 | 48 | 101111 |
| 1 | 1 | 1 | 1 | 1 | 0 | 1 | 1 | 0 | 1 | 49 | 110000 |
| 1 | 1 | 1 | 1 | 1 | 0 | 1 | 1 | 1 | 0 | 50 | 110001 |
| 1 | 1 | 1 | 1 | 1 | 1 | 0 | 0 | 1 | 1 | 51 | 110010 |
| 1 | 1 | 1 | 1 | 1 | 1 | 0 | 1 | 0 | 1 | 52 | 110011 |
| 1 | 1 | 1 | 1 | 1 | 1 | 0 | 1 | 1 | 0 | 53 | 110100 |
| 1 | 1 | 1 | 1 | 1 | 1 | 1 | 0 | 0 | 1 | 54 | 110101 |
| 1 | 1 | 1 | 1 | 1 | 1 | 1 | 0 | 1 | 0 | 55 | 110110 |
| 1 | 1 | 1 | 1 | 1 | 1 | 1 | 1 | 0 | 0 | 56 | 110111 |
| More Than 2 Errors | | | | | | | | | | | |
| | | | | | | | | | | 57 | 111111 |

Ten code words 730b are also obtained in the second example illustrated in FIG. 8. In this example, the code word loss detection module 732b detects (e.g., determines 402) three unsuccessfully received code words 734b. The communication device generates 404 a ten bit uncoded ACK/NACK sequence 736b. In this example, the uncoded ACK/NACK sequence S=0001111111 738b. Assume again that the ACK/NACK source coding module 704b has determined 406 a threshold K=2 740b. The ACK/NACK source coding module 704b determines 408 that the number of unsuccessfully (e.g., incorrectly) received code words 734b is greater than the threshold 740b (i.e., 3>2). The ACK/NACK source coding module 704b generates 410 a six bit compressed ACK/NACK sequence 744b indicating that all of the ten code words 730b were unsuccessfully received. This may also indicate that all ten code words 730b need to be retransmitted. In this second example, the six bit compressed ACK/NACK sequence 744b may be 111111 as illustrated in Table (1) above.

The third example given in FIG. 8 also illustrates that ten code words 730c are obtained by the communication device. The code word loss detection module 732c determines 602 that three code words were unsuccessfully received 734c. The communication device generates 604 a ten bit uncoded ACK/NACK sequence 736c S=0001111111 738c. In this example, the ACK/NACK source coding module 704c has determined 606 a threshold K=3 740c. Furthermore, the ACK/NACK source coding module 704c uses additional compression, using cases of K+1 unsuccessfully received code words 228 to represent cases with K unsuccessfully received code words (e.g., K=3) 742. The ACK/NACK source coding module 704c determines 612 that the number of unsuccessfully received code words is equal to the threshold 740c (i.e., 3=3). In this example, the ACK/NACK coding module generates 614 a seven bit compressed ACK/NACK sequence 744c indicating that four specific code words 228 were unsuccessfully received, which may also indicate that they 228 need to be retransmitted. For the ten bit uncoded ACK/NACK sequence S=0001111111 738c, one example of a seven bit compressed ACK/NACK sequence S'=0111000 744c. In this case, S' may be interpreted as 0000111111, with one extra NACK reported (e.g., the fourth code word 228). Additional examples of seven bit compressed ACK/NACK sequences (abbreviated as "Comp. A/N Seq." for convenience) corresponding to ten bit uncoded ACK/NACK sequences are illustrated in Table (2) below.

TABLE (2)

| Uncoded ACK/NACK Sequence | | | | | | | | | | Representative 4-Error Sequence | | | | | | | | | | Comp. A/N Seq. |
|---|---|---|---|---|---|---|---|---|---|---|---|---|---|---|---|---|---|---|---|---|
| No Errors | | | | | | | | | | | | | | | | | | | | |
| 1 | 1 | 1 | 1 | 1 | 1 | 1 | 1 | 1 | 1 | | | | | | | | | | 1 | 0000000 |
| 1 Error | | | | | | | | | | | | | | | | | | | | |
| 0 | 1 | 1 | 1 | 1 | 1 | 1 | 1 | 1 | 1 | | | | | | | | | | 2 | 0000001 |
| 1 | 0 | 1 | 1 | 1 | 1 | 1 | 1 | 1 | 1 | | | | | | | | | | 3 | 0000010 |
| 1 | 1 | 0 | 1 | 1 | 1 | 1 | 1 | 1 | 1 | | | | | | | | | | 4 | 0000011 |
| 1 | 1 | 1 | 0 | 1 | 1 | 1 | 1 | 1 | 1 | | | | | | | | | | 5 | 0000100 |
| 1 | 1 | 1 | 1 | 0 | 1 | 1 | 1 | 1 | 1 | | | | | | | | | | 6 | 0000101 |
| 1 | 1 | 1 | 1 | 1 | 0 | 1 | 1 | 1 | 1 | | | | | | | | | | 7 | 0000110 |
| 1 | 1 | 1 | 1 | 1 | 1 | 0 | 1 | 1 | 1 | | | | | | | | | | 8 | 0000111 |
| 1 | 1 | 1 | 1 | 1 | 1 | 1 | 0 | 1 | 1 | | | | | | | | | | 9 | 0001000 |
| 1 | 1 | 1 | 1 | 1 | 1 | 1 | 1 | 0 | 1 | | | | | | | | | | 10 | 0001001 |
| 1 | 1 | 1 | 1 | 1 | 1 | 1 | 1 | 1 | 0 | | | | | | | | | | 11 | 0001010 |
| 2 Errors | | | | | | | | | | | | | | | | | | | | |
| 0 | 0 | 1 | 1 | 1 | 1 | 1 | 1 | 1 | 1 | | | | | | | | | | 12 | 0001011 |
| 0 | 1 | 0 | 1 | 1 | 1 | 1 | 1 | 1 | 1 | | | | | | | | | | 13 | 0001100 |
| 0 | 1 | 1 | 0 | 1 | 1 | 1 | 1 | 1 | 1 | | | | | | | | | | 14 | 0001101 |
| 0 | 1 | 1 | 1 | 0 | 1 | 1 | 1 | 1 | 1 | | | | | | | | | | 15 | 0001110 |
| 0 | 1 | 1 | 1 | 1 | 0 | 1 | 1 | 1 | 1 | | | | | | | | | | 16 | 0001111 |
| 0 | 1 | 1 | 1 | 1 | 1 | 0 | 1 | 1 | 1 | | | | | | | | | | 17 | 0010000 |
| 0 | 1 | 1 | 1 | 1 | 1 | 1 | 0 | 1 | 1 | | | | | | | | | | 18 | 0010001 |
| 0 | 1 | 1 | 1 | 1 | 1 | 1 | 1 | 0 | 1 | | | | | | | | | | 19 | 0010010 |
| 0 | 1 | 1 | 1 | 1 | 1 | 1 | 1 | 1 | 0 | | | | | | | | | | 20 | 0010011 |
| 1 | 0 | 0 | 1 | 1 | 1 | 1 | 1 | 1 | 1 | | | | | | | | | | 21 | 0010100 |
| 1 | 0 | 1 | 0 | 1 | 1 | 1 | 1 | 1 | 1 | | | | | | | | | | 22 | 0010101 |
| 1 | 0 | 1 | 1 | 0 | 1 | 1 | 1 | 1 | 1 | | | | | | | | | | 23 | 0010110 |
| 1 | 0 | 1 | 1 | 1 | 0 | 1 | 1 | 1 | 1 | | | | | | | | | | 24 | 0010111 |
| 1 | 0 | 1 | 1 | 1 | 1 | 0 | 1 | 1 | 1 | | | | | | | | | | 25 | 0011000 |
| 1 | 0 | 1 | 1 | 1 | 1 | 1 | 0 | 1 | 1 | | | | | | | | | | 26 | 0011001 |
| 1 | 0 | 1 | 1 | 1 | 1 | 1 | 1 | 0 | 1 | | | | | | | | | | 27 | 0011010 |
| 1 | 0 | 1 | 1 | 1 | 1 | 1 | 1 | 1 | 0 | | | | | | | | | | 28 | 0011011 |
| 1 | 1 | 0 | 0 | 1 | 1 | 1 | 1 | 1 | 1 | | | | | | | | | | 29 | 0011100 |
| 1 | 1 | 0 | 1 | 0 | 1 | 1 | 1 | 1 | 1 | | | | | | | | | | 30 | 0011101 |
| 1 | 1 | 0 | 1 | 1 | 0 | 1 | 1 | 1 | 1 | | | | | | | | | | 31 | 0011110 |
| 1 | 1 | 0 | 1 | 1 | 1 | 0 | 1 | 1 | 1 | | | | | | | | | | 32 | 0011111 |
| 1 | 1 | 0 | 1 | 1 | 1 | 1 | 0 | 1 | 1 | | | | | | | | | | 33 | 0100000 |
| 1 | 1 | 0 | 1 | 1 | 1 | 1 | 1 | 0 | 1 | | | | | | | | | | 34 | 0100001 |
| 1 | 1 | 0 | 1 | 1 | 1 | 1 | 1 | 1 | 0 | | | | | | | | | | 35 | 0100010 |
| 1 | 1 | 1 | 0 | 0 | 1 | 1 | 1 | 1 | 1 | | | | | | | | | | 36 | 0100011 |
| 1 | 1 | 1 | 0 | 1 | 0 | 1 | 1 | 1 | 1 | | | | | | | | | | 37 | 0100100 |
| 1 | 1 | 1 | 0 | 1 | 1 | 0 | 1 | 1 | 1 | | | | | | | | | | 38 | 0100101 |
| 1 | 1 | 1 | 0 | 1 | 1 | 1 | 0 | 1 | 1 | | | | | | | | | | 39 | 1001100 |
| 1 | 1 | 1 | 0 | 1 | 1 | 1 | 1 | 0 | 1 | | | | | | | | | | 40 | 0100111 |
| 1 | 1 | 1 | 0 | 1 | 1 | 1 | 1 | 1 | 0 | | | | | | | | | | 41 | 0101000 |
| 1 | 1 | 1 | 1 | 0 | 0 | 1 | 1 | 1 | 1 | | | | | | | | | | 42 | 0101001 |
| 1 | 1 | 1 | 1 | 0 | 1 | 0 | 1 | 1 | 1 | | | | | | | | | | 43 | 0101010 |
| 1 | 1 | 1 | 1 | 0 | 1 | 1 | 0 | 1 | 1 | | | | | | | | | | 44 | 0101011 |
| 1 | 1 | 1 | 1 | 0 | 1 | 1 | 1 | 0 | 1 | | | | | | | | | | 45 | 0101100 |
| 1 | 1 | 1 | 1 | 0 | 1 | 1 | 1 | 1 | 0 | | | | | | | | | | 46 | 0101101 |
| 1 | 1 | 1 | 1 | 1 | 0 | 0 | 1 | 1 | 1 | | | | | | | | | | 47 | 0101110 |
| 1 | 1 | 1 | 1 | 1 | 0 | 1 | 0 | 1 | 1 | | | | | | | | | | 48 | 0101111 |
| 1 | 1 | 1 | 1 | 1 | 0 | 1 | 1 | 0 | 1 | | | | | | | | | | 49 | 0110000 |
| 1 | 1 | 1 | 1 | 1 | 0 | 1 | 1 | 1 | 0 | | | | | | | | | | 50 | 0110001 |
| 1 | 1 | 1 | 1 | 1 | 1 | 0 | 0 | 1 | 1 | | | | | | | | | | 51 | 0110010 |
| 1 | 1 | 1 | 1 | 1 | 1 | 0 | 1 | 0 | 1 | | | | | | | | | | 52 | 0110011 |
| 1 | 1 | 1 | 1 | 1 | 1 | 0 | 1 | 1 | 0 | | | | | | | | | | 53 | 0110100 |
| 1 | 1 | 1 | 1 | 1 | 1 | 1 | 0 | 0 | 1 | | | | | | | | | | 54 | 0110101 |
| 1 | 1 | 1 | 1 | 1 | 1 | 1 | 0 | 1 | 0 | | | | | | | | | | 55 | 0110110 |
| 1 | 1 | 1 | 1 | 1 | 1 | 1 | 1 | 0 | 0 | | | | | | | | | | 56 | 0110111 |
| 3 Errors | | | | | | | | | | | | | | | | | | | | |
| 0 | 0 | 0 | 1 | 1 | 1 | 1 | 1 | 1 | 1 | 0 | 0 | 0 | 0 | 1 | 1 | 1 | 1 | 1 | 57 | 0111000 |
| 0 | 0 | 1 | 0 | 1 | 1 | 1 | 1 | 1 | 1 | | | | | | | | | | | |
| 0 | 1 | 0 | 0 | 1 | 1 | 1 | 1 | 1 | 1 | | | | | | | | | | | |
| 1 | 0 | 0 | 0 | 1 | 1 | 1 | 1 | 1 | 1 | | | | | | | | | | | |
| 0 | 0 | 1 | 1 | 0 | 1 | 1 | 1 | 1 | 1 | 0 | 0 | 1 | 1 | 0 | 0 | 1 | 1 | 1 | 58 | 0111001 |
| 0 | 0 | 1 | 1 | 1 | 0 | 1 | 1 | 1 | 1 | | | | | | | | | | | |
| 0 | 1 | 1 | 0 | 0 | 1 | 1 | 1 | 1 | 1 | | | | | | | | | | | |
| 1 | 0 | 1 | 1 | 0 | 0 | 1 | 1 | 1 | 1 | | | | | | | | | | | |

TABLE (2)-continued

| Uncoded ACK/NACK Sequence | | | | | | | | | | | | | | | | | | | | Comp. A/N Seq. | |
|---|---|---|---|---|---|---|---|---|---|---|---|---|---|---|---|---|---|---|---|---|---|
| 0 | 0 | 1 | 1 | 1 | 1 | 0 | 1 | 1 | 1 | 0 | 0 | 1 | 1 | 1 | 1 | 0 | 0 | 1 | 1 | 59 | 0111010 |
| 0 | 0 | 1 | 1 | 1 | 1 | 1 | 0 | 1 | 1 | | | | | | | | | | | | |
| 0 | 1 | 1 | 1 | 1 | 1 | 0 | 0 | 1 | 1 | | | | | | | | | | | | |
| 1 | 0 | 1 | 1 | 1 | 1 | 0 | 0 | 1 | 1 | | | | | | | | | | | | |
| 0 | 0 | 1 | 1 | 1 | 1 | 1 | 0 | 1 | 1 | 0 | 0 | 1 | 1 | 1 | 1 | 1 | 0 | 0 | 1 | 60 | 0111011 |
| 0 | 0 | 1 | 1 | 1 | 1 | 1 | 1 | 1 | 0 | | | | | | | | | | | | |
| 0 | 1 | 1 | 1 | 1 | 1 | 1 | 0 | 0 | 0 | | | | | | | | | | | | |
| 1 | 0 | 1 | 1 | 1 | 1 | 1 | 0 | 0 | 0 | | | | | | | | | | | | |
| 0 | 1 | 0 | 1 | 0 | 1 | 1 | 1 | 1 | 1 | 0 | 1 | 0 | 1 | 0 | 0 | 1 | 1 | 1 | 1 | 61 | 0111100 |
| 0 | 1 | 0 | 1 | 1 | 0 | 1 | 1 | 1 | 1 | | | | | | | | | | | | |
| 1 | 1 | 0 | 1 | 0 | 0 | 1 | 1 | 1 | 1 | | | | | | | | | | | | |
| 0 | 1 | 0 | 1 | 1 | 1 | 0 | 1 | 1 | 1 | 0 | 1 | 0 | 1 | 1 | 1 | 0 | 0 | 1 | 1 | 62 | 0111101 |
| 0 | 1 | 0 | 1 | 1 | 1 | 1 | 0 | 1 | 1 | | | | | | | | | | | | |
| 1 | 1 | 0 | 1 | 1 | 1 | 0 | 0 | 1 | 1 | | | | | | | | | | | | |
| 0 | 1 | 0 | 1 | 1 | 1 | 1 | 0 | 1 | 1 | 0 | 1 | 0 | 1 | 1 | 1 | 1 | 0 | 0 | 1 | 63 | 0111110 |
| 0 | 1 | 0 | 1 | 1 | 1 | 1 | 1 | 1 | 0 | | | | | | | | | | | | |
| 1 | 1 | 0 | 1 | 1 | 1 | 1 | 0 | 0 | 0 | | | | | | | | | | | | |
| 0 | 1 | 1 | 0 | 0 | 1 | 1 | 1 | 1 | 1 | 0 | 1 | 1 | 0 | 0 | 0 | 1 | 1 | 1 | 1 | 64 | 0111111 |
| 0 | 1 | 1 | 0 | 1 | 0 | 1 | 1 | 1 | 1 | | | | | | | | | | | | |
| 1 | 1 | 1 | 0 | 0 | 0 | 1 | 1 | 1 | 1 | | | | | | | | | | | | |
| 0 | 1 | 1 | 0 | 1 | 0 | 1 | 1 | 1 | 1 | 0 | 1 | 1 | 0 | 1 | 1 | 0 | 0 | 1 | 1 | 65 | 1000000 |
| 0 | 1 | 1 | 0 | 1 | 1 | 1 | 0 | 1 | 1 | | | | | | | | | | | | |
| 1 | 1 | 1 | 0 | 1 | 1 | 0 | 0 | 1 | 1 | | | | | | | | | | | | |
| 0 | 1 | 1 | 0 | 1 | 1 | 1 | 0 | 1 | 1 | 0 | 1 | 1 | 0 | 1 | 1 | 1 | 0 | 0 | 1 | 66 | 1000001 |
| 0 | 1 | 1 | 0 | 1 | 1 | 1 | 1 | 1 | 0 | | | | | | | | | | | | |
| 1 | 1 | 1 | 0 | 1 | 1 | 1 | 0 | 0 | 0 | | | | | | | | | | | | |
| 0 | 1 | 1 | 1 | 0 | 1 | 0 | 1 | 1 | 1 | 0 | 1 | 1 | 1 | 0 | 1 | 0 | 0 | 1 | 1 | 67 | 1000010 |
| 0 | 1 | 1 | 1 | 0 | 1 | 1 | 0 | 1 | 1 | | | | | | | | | | | | |
| 1 | 1 | 1 | 1 | 0 | 1 | 0 | 0 | 1 | 1 | | | | | | | | | | | | |
| 0 | 1 | 1 | 1 | 0 | 1 | 1 | 0 | 1 | 1 | 0 | 1 | 1 | 1 | 0 | 1 | 1 | 0 | 0 | 1 | 68 | 1000011 |
| 0 | 1 | 1 | 1 | 0 | 1 | 1 | 1 | 1 | 0 | | | | | | | | | | | | |
| 1 | 1 | 1 | 1 | 0 | 1 | 1 | 0 | 0 | 0 | | | | | | | | | | | | |
| 0 | 1 | 1 | 1 | 1 | 0 | 0 | 1 | 1 | 1 | 0 | 1 | 1 | 1 | 1 | 0 | 0 | 0 | 1 | 1 | 69 | 1000100 |
| 0 | 1 | 1 | 1 | 1 | 0 | 1 | 0 | 1 | 1 | | | | | | | | | | | | |
| 1 | 1 | 1 | 1 | 1 | 0 | 0 | 0 | 1 | 1 | | | | | | | | | | | | |
| 0 | 1 | 1 | 1 | 1 | 0 | 1 | 0 | 0 | 1 | 0 | 1 | 1 | 1 | 1 | 0 | 1 | 1 | 0 | 0 | 70 | 1000101 |
| 0 | 1 | 1 | 1 | 1 | 0 | 1 | 1 | 1 | 0 | | | | | | | | | | | | |
| 0 | 1 | 1 | 1 | 1 | 0 | 1 | 0 | 0 | 1 | 0 | 1 | 1 | 1 | 1 | 0 | 1 | 0 | 0 | 0 | 71 | 1000110 |
| 1 | 1 | 1 | 1 | 1 | 0 | 1 | 0 | 0 | 0 | | | | | | | | | | | | |
| 0 | 1 | 1 | 1 | 1 | 1 | 0 | 0 | 0 | 1 | 0 | 1 | 1 | 1 | 1 | 1 | 0 | 0 | 0 | 0 | 72 | 1000111 |
| 0 | 1 | 1 | 1 | 1 | 1 | 0 | 1 | 0 | 0 | | | | | | | | | | | | |
| 1 | 1 | 1 | 1 | 1 | 1 | 0 | 0 | 0 | 0 | | | | | | | | | | | | |
| 1 | 0 | 0 | 1 | 0 | 1 | 1 | 1 | 1 | 1 | 1 | 0 | 0 | 1 | 0 | 0 | 1 | 1 | 1 | 1 | 73 | 1001000 |
| 1 | 0 | 0 | 1 | 1 | 0 | 1 | 1 | 1 | 1 | | | | | | | | | | | | |
| 1 | 0 | 0 | 1 | 1 | 0 | 1 | 1 | 1 | 1 | 1 | 0 | 0 | 1 | 1 | 0 | 0 | 0 | 1 | 1 | 74 | 1001001 |
| 1 | 0 | 0 | 1 | 1 | 1 | 0 | 1 | 1 | 1 | | | | | | | | | | | | |
| 1 | 0 | 0 | 1 | 1 | 1 | 1 | 0 | 1 | 1 | 1 | 0 | 0 | 1 | 1 | 1 | 1 | 0 | 0 | 0 | 75 | 1001010 |
| 1 | 0 | 0 | 1 | 1 | 1 | 1 | 1 | 1 | 0 | | | | | | | | | | | | |
| 1 | 0 | 1 | 0 | 0 | 1 | 1 | 1 | 1 | 1 | 1 | 0 | 1 | 0 | 0 | 0 | 1 | 1 | 1 | 1 | 76 | 1001011 |
| 1 | 0 | 1 | 0 | 1 | 0 | 1 | 1 | 1 | 1 | | | | | | | | | | | | |
| 1 | 0 | 1 | 0 | 1 | 0 | 1 | 1 | 1 | 1 | 1 | 0 | 1 | 0 | 1 | 0 | 0 | 0 | 1 | 1 | 77 | 1001100 |
| 1 | 0 | 1 | 0 | 1 | 1 | 0 | 1 | 1 | 1 | | | | | | | | | | | | |
| 1 | 0 | 1 | 0 | 1 | 1 | 1 | 0 | 1 | 1 | 1 | 0 | 1 | 0 | 1 | 1 | 1 | 0 | 0 | 0 | 78 | 1001101 |
| 1 | 0 | 1 | 0 | 1 | 1 | 1 | 1 | 1 | 0 | | | | | | | | | | | | |
| 1 | 0 | 1 | 1 | 0 | 1 | 0 | 1 | 1 | 1 | 1 | 0 | 1 | 0 | 1 | 0 | 0 | 0 | 1 | 1 | 79 | 1001110 |
| 1 | 0 | 1 | 1 | 0 | 1 | 1 | 0 | 1 | 1 | | | | | | | | | | | | |
| 1 | 0 | 1 | 1 | 0 | 1 | 1 | 0 | 0 | 1 | 1 | 0 | 1 | 0 | 1 | 1 | 1 | 0 | 0 | 0 | 80 | 1001111 |
| 1 | 0 | 1 | 1 | 0 | 1 | 1 | 1 | 1 | 0 | | | | | | | | | | | | |
| 1 | 0 | 1 | 1 | 1 | 0 | 0 | 1 | 1 | 1 | 1 | 0 | 1 | 1 | 1 | 0 | 0 | 0 | 1 | 1 | 81 | 1010000 |
| 1 | 0 | 1 | 1 | 1 | 0 | 1 | 0 | 1 | 1 | | | | | | | | | | | | |
| 1 | 0 | 1 | 1 | 1 | 0 | 1 | 0 | 0 | 1 | 1 | 0 | 1 | 1 | 1 | 0 | 1 | 1 | 0 | 0 | 82 | 1010001 |
| 1 | 0 | 1 | 1 | 1 | 0 | 1 | 1 | 1 | 0 | | | | | | | | | | | | |
| 1 | 1 | 1 | 1 | 1 | 0 | 1 | 0 | 0 | 1 | | | | | | | | | | | | |
| 1 | 0 | 1 | 1 | 1 | 1 | 0 | 1 | 0 | 1 | 1 | 0 | 1 | 1 | 1 | 1 | 0 | 1 | 0 | 0 | 86 | 1010010 |
| 1 | 0 | 1 | 1 | 1 | 1 | 0 | 1 | 1 | 0 | | | | | | | | | | | | |
| 1 | 0 | 1 | 1 | 1 | 1 | 0 | 0 | 0 | 1 | 1 | 0 | 1 | 1 | 1 | 1 | 1 | 0 | 0 | 0 | 84 | 1010011 |
| 1 | 0 | 1 | 1 | 1 | 1 | 1 | 0 | 1 | 0 | | | | | | | | | | | | |
| 1 | 1 | 0 | 0 | 0 | 1 | 1 | 1 | 1 | 1 | 1 | 1 | 0 | 0 | 0 | 0 | 1 | 1 | 1 | 1 | 85 | 1010100 |
| 1 | 1 | 0 | 0 | 1 | 0 | 1 | 1 | 1 | 1 | | | | | | | | | | | | |
| 1 | 1 | 0 | 0 | 1 | 0 | 1 | 1 | 1 | 1 | 1 | 1 | 0 | 0 | 1 | 0 | 0 | 0 | 1 | 1 | 86 | 1010101 |
| 1 | 1 | 0 | 0 | 1 | 1 | 0 | 1 | 1 | 1 | | | | | | | | | | | | |
| 1 | 1 | 0 | 0 | 1 | 1 | 1 | 0 | 1 | 1 | 1 | 1 | 0 | 0 | 1 | 1 | 1 | 0 | 0 | 0 | 87 | 1010110 |
| 1 | 1 | 0 | 0 | 1 | 1 | 1 | 1 | 1 | 0 | | | | | | | | | | | | |
| 1 | 1 | 0 | 1 | 0 | 1 | 0 | 1 | 1 | 1 | 1 | 1 | 0 | 1 | 0 | 1 | 0 | 0 | 1 | 1 | 88 | 1010111 |
| 1 | 1 | 0 | 1 | 0 | 1 | 1 | 0 | 1 | 1 | | | | | | | | | | | | |

TABLE (2)-continued

| Uncoded ACK/NACK Sequence | | | | | | | | | | | | | | | | | | | Comp. A/N Seq. |
|---|---|---|---|---|---|---|---|---|---|---|---|---|---|---|---|---|---|---|---|
| 1 | 1 | 0 | 1 | 0 | 1 | 1 | 1 | 0 | 1 | 1 | 1 | 0 | 1 | 0 | 1 | 1 | 1 | 0 | 0 | 89 | 1011000 |
| 1 | 1 | 0 | 1 | 0 | 1 | 1 | 1 | 1 | 0 | | | | | | | | | | | | |
| 1 | 1 | 0 | 1 | 1 | 0 | 0 | 1 | 1 | 1 | 1 | 1 | 0 | 1 | 1 | 0 | 0 | 0 | 1 | 1 | 90 | 1011001 |
| 1 | 1 | 0 | 1 | 1 | 0 | 1 | 0 | 1 | 1 | | | | | | | | | | | | |
| 1 | 1 | 0 | 1 | 1 | 0 | 1 | 1 | 0 | 1 | 1 | 1 | 0 | 1 | 1 | 0 | 1 | 1 | 0 | 0 | 91 | 1011010 |
| 1 | 1 | 0 | 1 | 1 | 0 | 1 | 1 | 1 | 0 | | | | | | | | | | | | |
| 1 | 1 | 0 | 1 | 1 | 1 | 0 | 1 | 0 | 1 | 1 | 1 | 0 | 1 | 1 | 1 | 0 | 1 | 0 | 0 | 92 | 1011011 |
| 1 | 1 | 0 | 1 | 1 | 1 | 0 | 1 | 1 | 0 | | | | | | | | | | | | |
| 1 | 1 | 0 | 1 | 1 | 1 | 1 | 0 | 0 | 1 | 1 | 1 | 0 | 1 | 1 | 1 | 1 | 0 | 0 | 0 | 93 | 1011100 |
| 1 | 1 | 0 | 1 | 1 | 1 | 1 | 0 | 1 | 0 | | | | | | | | | | | | |
| 1 | 1 | 1 | 0 | 0 | 1 | 0 | 1 | 1 | 1 | 1 | 1 | 0 | 0 | 1 | 0 | 0 | 1 | 1 | 1 | 94 | 1011101 |
| 1 | 1 | 1 | 0 | 0 | 1 | 1 | 0 | 1 | 1 | | | | | | | | | | | | |
| 1 | 1 | 1 | 0 | 0 | 1 | 1 | 1 | 0 | 1 | 1 | 1 | 1 | 0 | 0 | 1 | 1 | 1 | 0 | 0 | 95 | 1011110 |
| 1 | 1 | 1 | 0 | 0 | 1 | 1 | 1 | 1 | 0 | | | | | | | | | | | | |
| 1 | 1 | 1 | 0 | 1 | 0 | 0 | 1 | 1 | 1 | 1 | 1 | 1 | 0 | 1 | 0 | 0 | 0 | 1 | 1 | 96 | 1011111 |
| 1 | 1 | 1 | 0 | 1 | 0 | 1 | 0 | 1 | 1 | | | | | | | | | | | | |
| 1 | 1 | 1 | 0 | 1 | 0 | 1 | 1 | 0 | 1 | 1 | 1 | 1 | 0 | 1 | 0 | 1 | 1 | 0 | 1 | 97 | 1100000 |
| 1 | 1 | 1 | 0 | 1 | 0 | 1 | 1 | 1 | 0 | | | | | | | | | | | | |
| 1 | 1 | 1 | 0 | 1 | 1 | 0 | 0 | 1 | 1 | 1 | 1 | 1 | 0 | 1 | 1 | 0 | 1 | 0 | 0 | 98 | 1100001 |
| 1 | 1 | 1 | 0 | 1 | 1 | 0 | 1 | 1 | 0 | | | | | | | | | | | | |
| 1 | 1 | 1 | 0 | 1 | 1 | 1 | 0 | 0 | 1 | 1 | 1 | 1 | 0 | 1 | 1 | 1 | 0 | 0 | 0 | 99 | 1100010 |
| 1 | 1 | 1 | 0 | 1 | 1 | 1 | 0 | 1 | 0 | | | | | | | | | | | | |
| 1 | 1 | 1 | 1 | 0 | 0 | 0 | 1 | 1 | 1 | 1 | 1 | 1 | 0 | 0 | 0 | 0 | 1 | 1 | 1 | 100 | 1100011 |
| 1 | 1 | 1 | 1 | 0 | 0 | 1 | 0 | 1 | 1 | | | | | | | | | | | | |
| 1 | 1 | 1 | 1 | 0 | 0 | 1 | 1 | 0 | 1 | 1 | 1 | 1 | 1 | 0 | 0 | 1 | 1 | 0 | 0 | 101 | 1100100 |
| 1 | 1 | 1 | 1 | 0 | 0 | 1 | 1 | 1 | 0 | | | | | | | | | | | | |
| 1 | 1 | 1 | 1 | 0 | 1 | 0 | 0 | 1 | 1 | 1 | 1 | 1 | 1 | 0 | 1 | 0 | 1 | 0 | 0 | 102 | 1100101 |
| 1 | 1 | 1 | 1 | 0 | 1 | 0 | 1 | 1 | 0 | | | | | | | | | | | | |
| 1 | 1 | 1 | 1 | 0 | 1 | 1 | 0 | 0 | 1 | 1 | 1 | 1 | 1 | 0 | 1 | 1 | 0 | 0 | 0 | 103 | 1100110 |
| 1 | 1 | 1 | 1 | 0 | 1 | 1 | 0 | 1 | 0 | | | | | | | | | | | | |
| 1 | 1 | 1 | 1 | 0 | 0 | 1 | 0 | 1 | 1 | 1 | 1 | 1 | 1 | 0 | 0 | 1 | 0 | 0 | 0 | 104 | 1100111 |
| 1 | 1 | 1 | 1 | 0 | 0 | 1 | 1 | 0 | | | | | | | | | | | | | |
| 1 | 1 | 1 | 1 | 1 | 0 | 0 | 0 | 1 | 1 | 1 | 1 | 1 | 1 | 0 | 1 | 0 | 0 | 0 | 0 | 105 | 1101000 |
| 1 | 1 | 1 | 1 | 1 | 0 | 1 | 0 | 1 | 0 | | | | | | | | | | | | |
| 1 | 1 | 1 | 1 | 1 | 0 | 0 | 0 | 1 | 1 | 1 | 1 | 1 | 1 | 1 | 0 | 0 | 0 | 0 | 0 | 106 | 1101001 |
| 1 | 1 | 1 | 1 | 1 | 1 | 0 | 0 | 1 | 0 | | | | | | | | | | | | |
| 4 Or More Errors | | | | | | | | | | | | | | | | | | | | | |
| All Sequences With 4 Or More Errors | | | | | | | | | | | | | | | | | | | | 107 | 1111111 |

Figure 9:
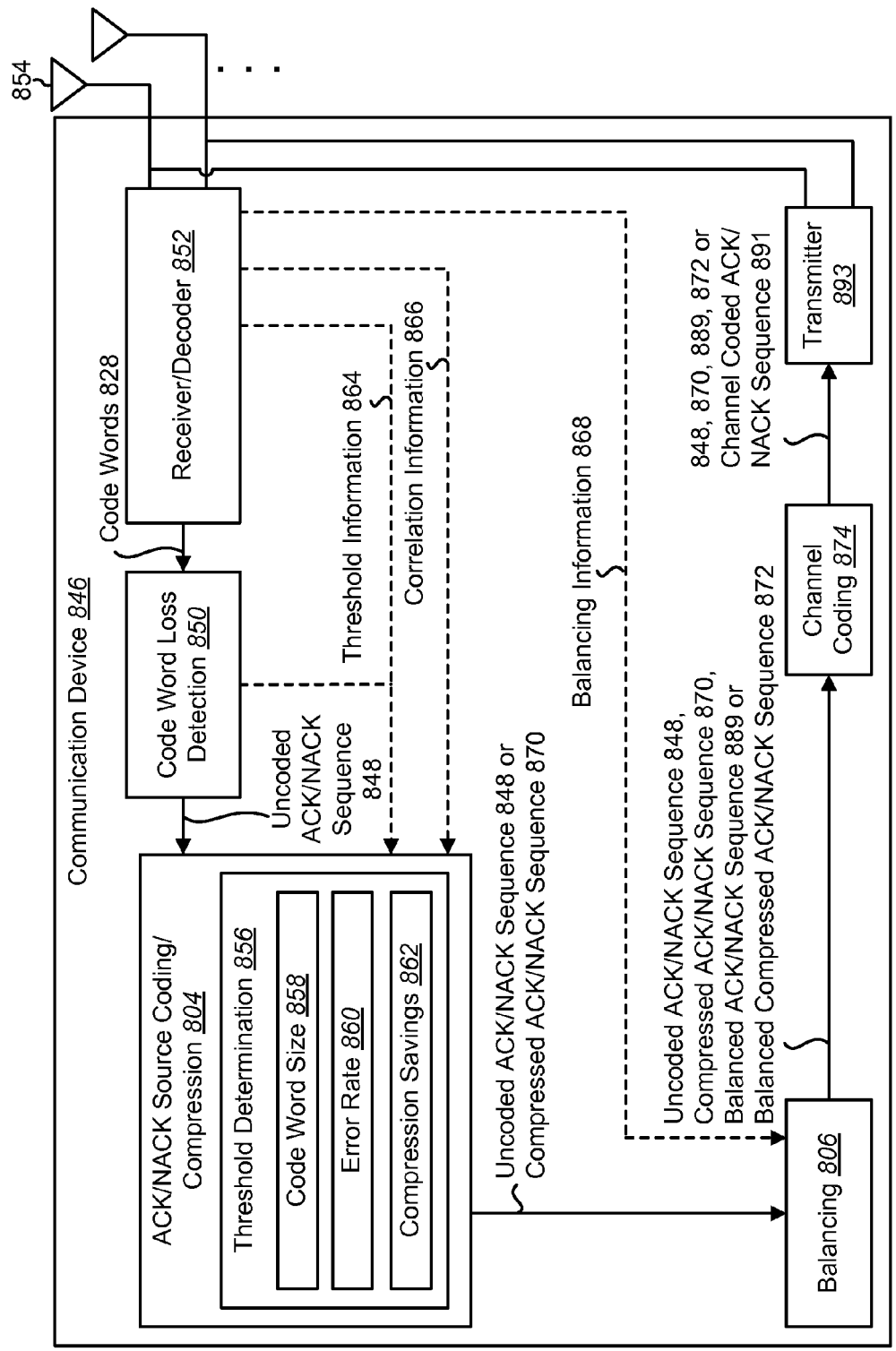
FIG. 9 is a block diagram illustrating one configuration of a communication device in which systems and methods for transmission of ACK/NACK in a wireless communication system may be implemented.

FIG. 9 is a block diagram illustrating one configuration of a communication device 846 in which systems and methods for transmission of ACK/NACK in a wireless communication system may be implemented. The communication device 846 may include one or more antennas 854, a receiver/decoder module 852, a code word loss detection module 850, an ACK/NACK source coding module 804, a balancing module 806, channel encoder module 874 and transmitter module 893. The receiver/decoder module 852 may be a hardware and/or software module used to receive and decode signals from another communication device. The receiver/decoder module 852 may be coupled to one or more antennas 854 to receive signals. Received signal demodulation and channel decoding are two examples of functions that may be performed by the receiver/decoder module 852. Furthermore, threshold information 864, correlation information 866 and balancing information 868 may be output by the receiver/decoder module. The threshold information 864 may include one or more code word sizes 858, one or more code word error rates 860 and/or a threshold, for example. In one configuration, threshold information (e.g., one or more thresholds (K), code word sizes 858, code word error rates 860, etc.) may be determined by the communication device 846 and explicitly communicated (e.g., between a wireless communication device 102 and a base station 112) using an uplink control channel 218 (e.g., PUCCH) or uplink shared channel 222 (e.g., PUSCH). The threshold information 864 may indicate the threshold (K) and consequently may be used to determine the number of bits representing the compressed ACK/NACK sequence 870. Examples of correlation information 866 include temporal correlation information, spectral correlation information and/or spatial correlation information. The balancing information 868 may include, for example, information used for scrambling, Gray coding and/or distribution shaping.

The receiver/decoder module 852 may output one or more code words 828 to the code word loss detection module 850. The communication device 846 may use the codeword loss detection module 850 to generate an uncoded ACK/NACK sequence 848 based on the code words 828.

The ACK/NACK source coding module 804 may be a hardware and/or software module used to generate a compressed ACK/NACK sequence 870. The ACK/NACK source coding module 804 may use the uncoded ACK/NACK sequence 848, threshold information 864 and/or correlation information 866. In particular, the ACK/NACK source coding module 804 may include a threshold determination module 856. The threshold determination module 856 may use the threshold information 864 to determine a threshold (K). For example, the threshold determination module 856 may use the code word size 858, the error rate 860 and/or the compression savings 862 to determine the threshold (K).

More specifically, the code word size 858 and the error rate 860 may be used to compute a number of "retransmission"

overhead bits from retransmitting successfully (e.g., correctly) received code words for one or more threshold values. This number of retransmission overhead bits may be compared to a number of "compression" overhead bits saved 862 by reducing the length of the uncoded ACK/NACK sequence 848 for one or more threshold values. The threshold determination module 856 may select a threshold value where the number of compression overhead bits saved 862 is greater than or equal to the number of retransmission overhead bits saved. As mentioned above, the amount of compression overhead bits saved may be optionally weighted in this comparison, since control channel 218, 224 bandwidth may be more valuable than data channel (e.g., carrier component 226) bandwidth. In this case, the threshold (K) may be selected when the number of compression overhead bits multiplied by a weighting factor is greater than or equal to the number of retransmission overhead bits. The threshold determination module 856 may also select a threshold (K) that saves the most bandwidth or weighted bandwidth.

As discussed above, the threshold information 864 may include a threshold. For example, the communication device 846 (e.g., a wireless communication device 102) may receive one or more thresholds determined by another communication device. The receiver/decoder module 852 may send the threshold to the ACK/NACK source coding module 804. The ACK/NACK source coding module 804 may use the received threshold to determine a threshold. In one configuration, the threshold determination module 856 may simply adopt the received threshold as the threshold to be used in compressing the uncoded ACK/NACK sequence 848.

The ACK/NACK source coding module 804 may optionally use correlation information 866 such as temporal correlation information, spectral correlation information and/or spatial correlation information to further compress the uncoded ACK/NACK sequence 848. The optional use of correlation information 866 is described in greater detail below in connection with FIG. 11.

The ACK/NACK source coding module 804 may output a compressed ACK/NACK sequence 870, which may be used by the balancing module 806. Alternatively, the ACK/NACK source coding/compression module 804 may not be included in the communication device 846 or bypassed. Thus, an uncoded ACK/NACK sequence 848 may be input into the balancing module 806. The balancing module 806 may be a hardware and/or software module that uses the uncoded 848 or compressed 870 ACK/NACK sequence to generate a balanced 889 or balanced compressed 872 ACK/NACK sequence. More specifically, the balancing module 806 may modify the uncoded 848 or compressed 870 ACK/NACK sequence such that the number of 1's is closer to the number of 0's in the resulting ACK/NACK sequence 889, 872. The balancing module 806 may generate balancing information such as scrambling information, Gray coding information and/or distribution shaping information. Alternatively or in addition, the balancing module 806 may use balancing information 868 (e.g., scrambling information, Gray coding information and/or distribution shaping information) from the receiver/decoder module 852 in generating the balanced 889 and/or balanced compressed 872 ACK/NACK sequence. The balancing module 806 is described in greater detail below in connection with FIG. 12.

The balancing module 806 may be optional. For example, the communication device 846 may optionally input the uncoded 848 or compressed 870 ACK/NACK sequence into the channel encoder module 874 for channel coding. However, ACK/NACK sequences (e.g., uncoded ACK/NACK sequence 848 or compressed ACK/NACK sequence 870) may have an imbalanced distribution of 1's and 0's, possibly causing degraded channel code performance. As a result, balancing the ACK/NACK sequences before channel coding may be beneficial to avoid degraded channel code performance. Thus, the uncoded 848, compressed 870, balanced 889 or balanced compressed 872 ACK/NACK sequence may be input into the channel encoder module 874. The channel encoder module 874 may channel code the ACK/NACK sequence 848, 870, 889, 872 to produce a channel coded ACK/NACK sequence 891. The ACK/NACK sequence 848, 870, 889, 872, 891 may be transmitted by the transmitter module 893 using one or more antennas 854. The ACK/NACK sequence 848, 870, 889, 872, 891 may also be modulated by the communication device 846 in preparation for transmission.

It should be noted that different code words 828 may carry different amounts or types of information. In particular, some designated code words 828 may carry more sensitive information or may be significantly larger (i.e., in number of bits) than others. One example of more sensitive code words is when the code words are carrying delay-sensitive information. When a particular code word 828 is large or carrying sensitive information, it may be beneficial to assign more priority to the corresponding ACK/NACK bit. Stronger code or unequal error protection may be used for the transmission of those ACK/NACK bits. The stronger code or unequal error protection may be applied in the channel encoder module 874. One example of unequal error protection follows. Assume that out of ten code words 228, the first code word 228 and the second code words 228 are large packets where it would be beneficial to not retransmit them unless they are in error. In this case, the corresponding ACK/NACK bits may be separated from the uncoded ACK/NACK sequence 848, with compression being performed on the remainder of the ACK/NACK sequence. Thus, unequal error protection is applied where the two uncompressed ACK/NACK bits 1487 received higher protection than the compressed ACK/NACK bits.

Figure 10:
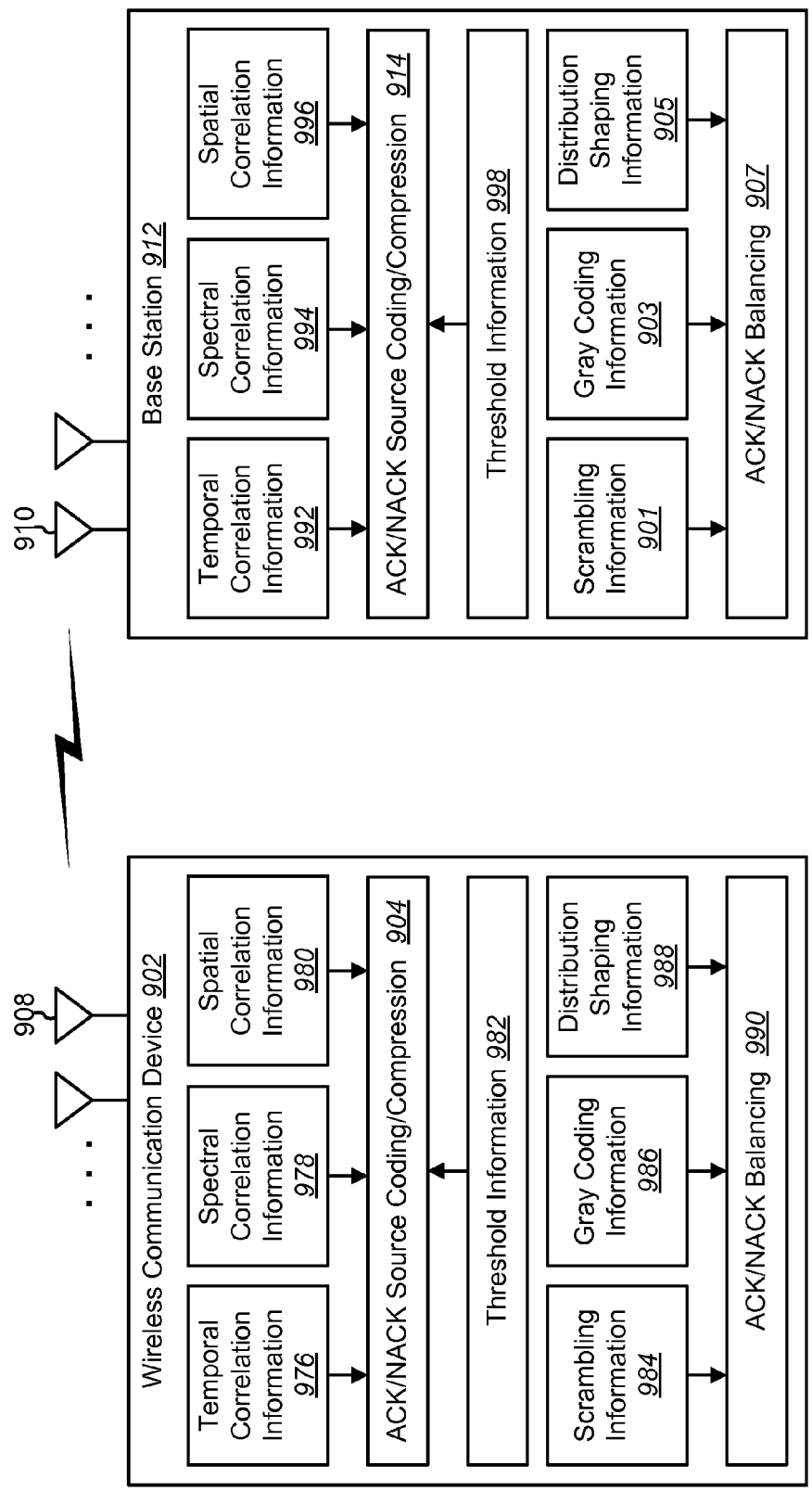
FIG. 10 is a block diagram illustrating several possible configurations of a wireless communication device and a base station in which systems and methods for transmission of ACK/NACK in a wireless communication system may be implemented.

FIG. 10 is a block diagram illustrating several possible configurations of a wireless communication device 902 and a base station 912 in which systems and methods for transmission of ACK/NACK in a wireless communication system may be implemented. A wireless communication device 902 may send and receive information to and from a base station 912 using one or more antennas 908. Additionally, a base station 912 may send and receive information to and from a wireless communication device 902 using one or more antennas 910. Several types of information may be generated and/or communicated by the wireless communication device 902 and/or base station 912. For example, the wireless communication device 902 and/or the base station 912 may generate, receive and/or transmit temporal correlation information 976, 992, spectral correlation information 978, 994, spatial correlation information 980, 996, threshold information 982, 998, scrambling information 984, 901, gray coding information 986, 903 and/or distribution shaping information 988, 905. Temporal correlation information 976, 992, spectral correlation information 978, 994, spatial correlation information 980, 996 and/or threshold information 982, 998 may be used by the ACK/NACK source coding module(s) 904, 914 to generate a compressed ACK/NACK sequence 870. Additionally, this information 976, 992, 978, 994, 980, 996, 982, 998 may be used by an ACK/NACK source decoding module 179, 183 to interpret, decode or decompress the compressed ACK/NACK sequence 870. The scrambling information 984, 901, Gray coding information 986, 903, and/or distribution shaping information 988, 905 may be used by the ACK/NACK balancing module(s) 990, 907 to balance an ACK/NACK sequence (e.g., uncoded 1448, compressed 1470 ACK/NACK sequence). Additionally, this information 984, 901, 986, 903, 988, 905 may be used by an ACK/NACK balancing decoding module 181, 185 to interpret or decode an ACK/NACK sequence (e.g., balanced 1489 or balanced compressed 1472 ACK/NACK sequence).

Depending on the configuration used, one or more of these types of information 976, 992, 978, 994, 980, 996, 982, 998, 984, 901, 986, 903, 988, 905 may be used by the wireless communication device 902 and/or base station 912 to compress and/or balance an ACK/NACK sequence. Furthermore, one or more of these types of information 976, 992, 978, 994, 980, 996, 982, 998, 984, 901, 986, 903, 988, 905 may be used to interpret (e.g., decode) an ACK/NACK sequence (e.g., compressed 1470, balanced 1489 and/or balanced compressed 1472 ACK/NACK sequence). FIG. 10 illustrates that each of these types of information 976, 992, 978, 994, 980, 996, 982, 998, 984, 901, 986, 903, 988, 905 may be generated and/or transmitted by either the wireless communication device 902, the base station 912 or both. All of the types of information 976, 992, 978, 994, 980, 996, 982, 998, 984, 901, 986, 903, 988, 905 need not be generated exclusively by either the wireless communication device 902 or the base station 912. Rather, the wireless communication device 902 and/or the base station 912 may generate and exchange one or more different types of information 976, 992, 978, 994, 980, 996, 982, 998, 984, 901, 986, 903, 988, 905 with each other.

By way of example and not limitation, one possible configuration is given hereafter. In this example, the wireless communication device 902 generates threshold information 982. For example, the wireless communication device 902 may determine a code word size 858 (e.g., based on received code words 228 or configuration information), a code word 228 error rate 860 (e.g., using a code word 228 loss detection module 850) and/or compression savings 862 (e.g., based on an uncoded ACK/NACK sequence 848 length and possible compressed ACK/NACK sequence lengths). The wireless communication device 902 may use this information to determine a threshold value (K), which it 902 may send to the base station 912 (e.g., using an uplink control channel 218 (e.g., PUCCH) or an uplink shared channel 222 (e.g., PUSCH)) to aid the base station 912 in decoding the compressed ACK/NACK sequence 870. For example, the threshold value (K) included in the threshold information 982 may be used to determine the number of bits representing the compressed ACK/NACK sequence 870. Continuing with the example, the base station 912 may generate temporal correlation information 992, spectral correlation information 994, spatial correlation information 996, scrambling information 901, Gray coding information 903 and/or distribution shaping information 905, which it 912 may send to the wireless communication device 902. The wireless communication device 902 may use this received information 992, 994, 996, 901, 903, 905 to compress and/or balance an ACK/NACK sequence. The wireless communication device 902 may additionally or alternatively use this received information 992, 994, 996, 901, 903, 905 to interpret a compressed 1470, balanced 1489 and/or balanced compressed 1472 ACK/NACK sequence received from the base station 912.

In another example, the base station 912 may determine the threshold information 998 (e.g., including a threshold) and consequently the number of bits representing the compressed ACK/NACK sequence 870. The base station 912 may share (e.g., transmit) this threshold information 998 to the wireless communication device 902 using explicit signaling. The threshold information 998 may be sent to the wireless communication device 902 using a downlink control channel 224 (e.g., PDCCH).

Figure 11:
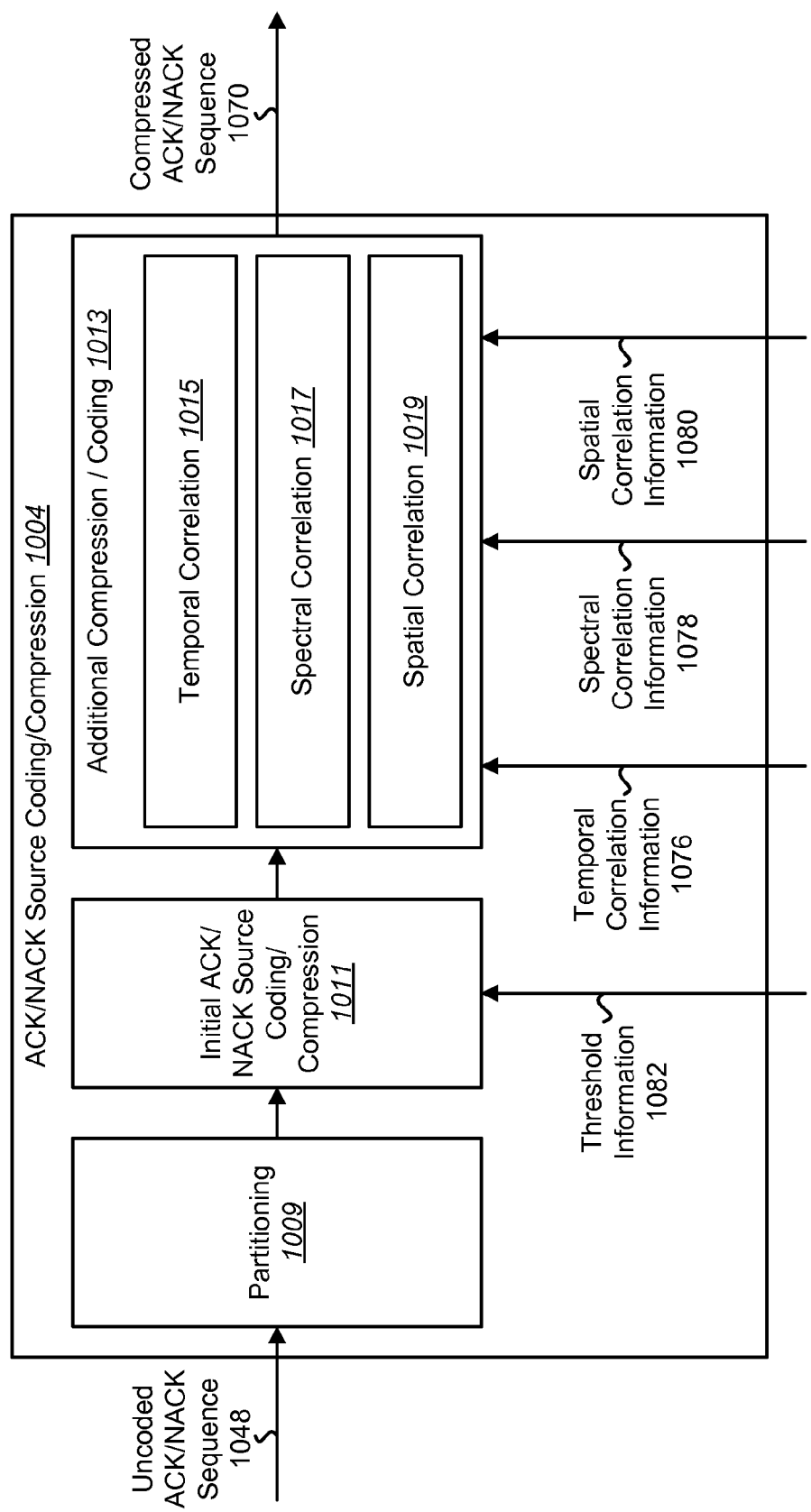
FIG. 11 is a block diagram illustrating more detail on one configuration of an ACK/NACK source coding module.

FIG. 11 is a block diagram illustrating more detail on one configuration of an ACK/NACK source coding module 1004. The ACK/NACK source coding module 1004 may receive an uncoded ACK/NACK sequence 1048. The uncoded ACK/NACK sequence 1048 may be optionally partitioned 1009 as described above in connection with FIG. 6. The uncoded and optionally partitioned ACK/NACK sequence 1048 may be input into an initial ACK/NACK source coding module 1011. The initial ACK/NACK source coding module 1011 may use a threshold (K) 1082 to compress (e.g., lossy-code) the uncoded ACK/NACK sequence 1048 as described above in connection with FIG. 5, 6, or 7. The output of the initial ACK/NACK source coding module 1011 may be input into an additional compression module 1013. The additional compression module 1013 may further compress the output of the initial ACK/NACK source coding module 1011.

The additional compression module 1013 may include a temporal correlation module 1015, a spectral correlation module 1017 and/or a spatial correlation module 1019. Temporal correlation information 1076, spectral correlation information 1078 and/or spatial correlation information 1080 may be received by the additional compression module 1013.

In general, temporal, spectral and spatial correlation among code words 228 or communication channels (e.g., carrier components 226) may be exploited in order to further compress the ACK/NACK sequence. For instance, if the transmission scheme (e.g., coding and modulation or communication rate) is not changing from one transmission to another and the corresponding channel is not changing, then it may be assumed that the outcome of the two transmissions are correlated as well.

The temporal correlation module 1015 may use temporal correlation information 1076 to further compress the ACK/NACK sequence. More specifically, temporal correlation may be used to send an ACK/NACK bit corresponding to changes (e.g., bit transitions) in the status of received code words. For example, if at time $t_1$ a received code word 228 (e.g., packet) is in error, a NACK is generated and/or transmitted. If the received signal (e.g., another code word 228) is still erroneous at time $t_2$, nothing is generated and/or transmitted. If the received signal (e.g., yet another code word 228) is successfully received at time $t_3$, then an ACK may be generated and/or sent. Thereafter, nothing may be generated and/or sent until another received code word 228 is in error. Thus, since ACKs/NACKs may only be generated and/or transmitted when there is a change between successful and unsuccessful reception (i.e., and vice-versa), the ACK/NACK sequence may be compressed even further.

The spectral correlation module 1017 and/or spatial correlation module 1019 may also be used to further compress the ACK/NACK sequence. For example, a spectral correlation threshold and/or a spatial correlation threshold may be determined. The spectral correlation threshold and/or the spatial correlation threshold may be generated by a communication device (e.g., a wireless communication device 102) and/or another communication device (e.g., a base station 112). The spectral correlation threshold may be sent and/or received as part of the spectral correlation information 1078. The spatial correlation threshold may similarly be sent and/or received as part of the spatial correlation information 1080. The spectral correlation threshold and/or the spatial correlation threshold may be explicitly communicated between communication devices (e.g., between a wireless communication devices 102 and a base station 112). If one or more of the spectral or spatial correlations between channels (e.g., carrier components 226, spatial channels) corresponding to two or more code words 228 is greater than the corresponding spectral and/or spatial threshold, only the status (ACK/NACK) of one of the two or more code words 228 may be reported (e.g., included in the compressed ACK/NACK sequence 1070).

Figure 12:
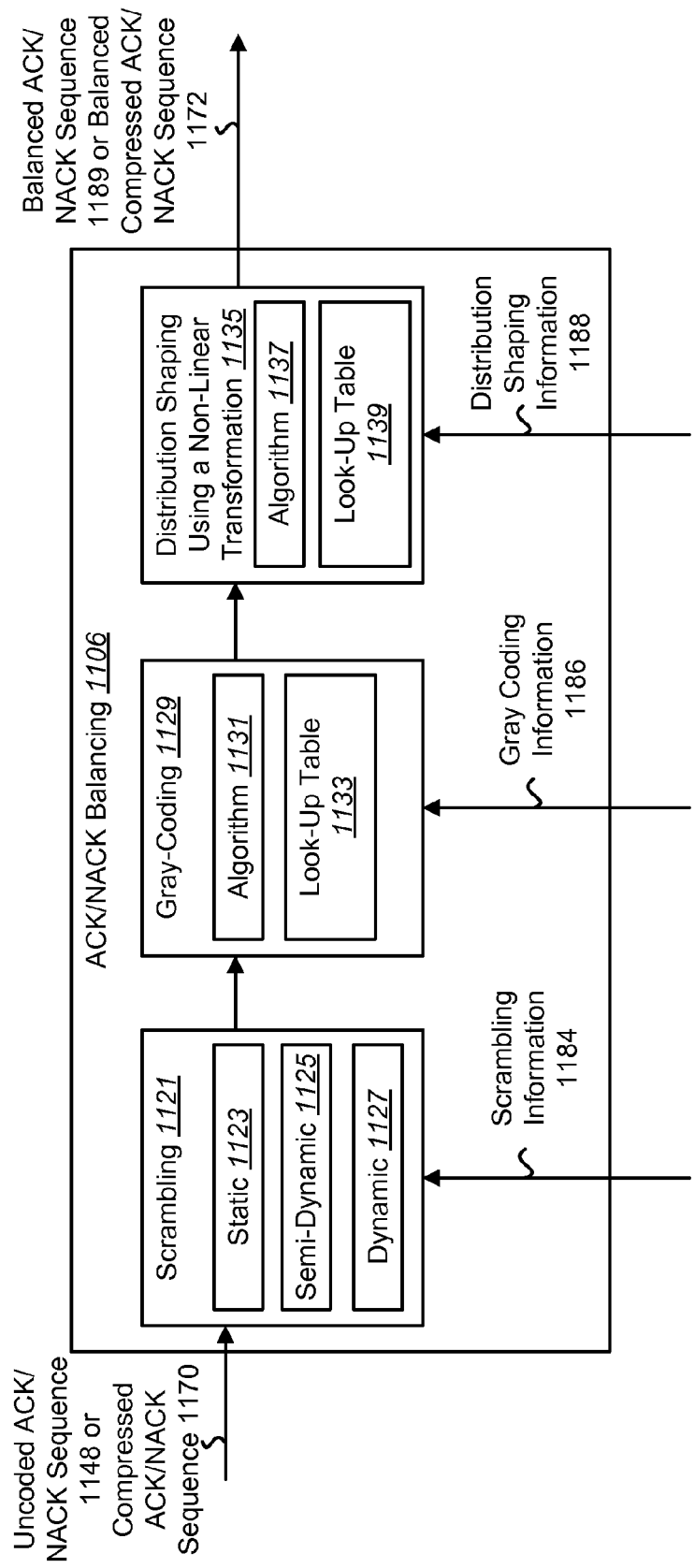
FIG. 12 is a block diagram illustrating more detail on one configuration of an ACK/NACK balancing module.

FIG. 12 is a block diagram illustrating more detail on one configuration of an ACK/NACK balancing module 1106. In terms of the numbers of 1's and 0's, ACK/NACK sequences may often be imbalanced as discussed above. This imbalance may degrade the performance of a channel code.

For example, in 3GPP LTE and LTE-Advance, the desired code word 228 error rate is typically less than 50%. In most cases, the desired code word 228 error rate is approximately 10%. As a consequence, the ACK/NACK bit corresponding to a received code word 228 takes the value 1 (e.g., for a successfully received code word 228) more often than the value 0. Therefore, in the uncoded ACK/NACK sequence (S) 1148 there are often more 1's than 0's. In a configuration where a communication device 846 channel encodes the uncoded ACK/NACK sequence (S) 1148, the input into the channel encoder (e.g., transmitter/encoder module 874) is often imbalanced. In other words, some realizations of the uncoded ACK/NACK sequence (S) occur more often than others. For example, an uncoded ACK/NACK sequence (S) having all 1's may occur much more often than a sequence having all 0's. That is, for a 10% code word 228 error rate, an uncoded ACK/NACK sequence (S) having all 1's occurs $0.9^{10} \approx 0.34$ or about 34% of the time. In contrast, an uncoded ACK/NACK sequence (S) having all 0's occurs almost never or $0.1^{10} = 10^{-10} = 0.00000001\%$ of the time. As a result, some of the compressed ACK/NACK code words 228 may be used more often that other code words 228.

The performance of a channel code is typically determined more by the performance of those code words 228 that are used more frequently, instead of the whole code book. In order to prevent this degradation in performance, the ACK/NACK balancing module 1106 may optionally balance the ACK/NACK sequence. That is, the ACK/NACK balancing module 1106 may transform the ACK/NACK sequence such that the number of 1's and 0's are roughly equal prior to channel coding. As discussed above, the ACK/NACK balancing module 1106 may operate on either an uncoded ACK/NACK sequence 1148 or a compressed ACK/NACK sequence 1170. In some cases, balancing may be more beneficial when applied to an uncoded ACK/NACK sequence 1148, since compression of an ACK/NACK sequence may reduce the severity of the unbalance. However, balancing may be combined with compression.

The ACK/NACK balancing module 1106 may use a scrambling module 1121, a Gray coding module 1129 and/or a distribution shaping module 1135 to balance the ACK/NACK sequence 1148, 1170, thereby producing a balanced 1189 or balanced compressed 1172 ACK/NACK sequence.

The scrambling module 1121 may modify the ACK/NACK sequence 1148, 1170 as follows. A pseudo-random sequence may be generated by the communication device 846 or generated by and/or received from another communication device. For example, a wireless communication device 102 may generate the pseudo-random sequence, may receive the pseudo-random sequence, or may receive parameters used to determine the pseudo random sequence from a base station 112. The pseudo-random sequence may be part of the information for scrambling 1184. The pseudo-random sequence may be used to scramble the ACK/NACK sequence 1148, 1170.

In one example, a pseudo-random scrambling sequence is generated by a wireless communication device 102 (e.g., UE) that is also known to a base station 112 (e.g., eNB). The ACK/NACK sequence 1148, 1170 may be exclusive or-ed (e.g., xor-ed) bit-by-bit with the scrambling sequence. In this example, a pseudo-random sequence generator (not shown) on the wireless communication device 102 (e.g., UE) can be initialized by a C-RNTI (Cell-Radio Network Temporary Identifier). This value is known at both the wireless communication device 102 (e.g., UE) and the base station (e.g., eNB) 112. Hence, no extra signaling may be required. However, other values may be used that are not known at either the wireless communication device 102 or the base station 112. In this case, signaling may be required to negotiate the pseudo-random sequence, the seed or initial values for the random or pseudo-random number generator.

As illustrated in FIG. 12, the information regarding the scrambling sequence (which may be specific to a particular communication device) may be static 1123, semi-dynamic (or "semi-static," for example) 1125 or dynamic 1127. For example, a specific scrambler sequence may be static 1123 as long as the wireless communication device 102 is registered with the base station 112. Or, the scrambler sequence may be updated frequently (e.g., dynamic 1127) or less frequently (e.g., semi-dynamic 1125). In either case, the scrambling information 1184 may need to be signaled to the wireless communication device 102 (e.g., via a PDCCH 224).

The Gray coding module 1129 may additionally or alternatively be used to balance the ACK/NACK sequence 1148, 1170. For example, a ten bit Gray code may be used for mapping the ACK/NACK sequence 1148, 1170 to a better-distributed sequence. The Gray coding module 1129 may use an algorithm 1131 and/or a look-up table 1133 to balance the ACK/NACK sequence 1148, 1170. The Gray coding information 1186 (e.g., configuration and/or parameters) may be negotiated (i.e., generated and/or exchanged) as described above. For example, the Gray coding information 1186 (e.g., an algorithm 1131 or look-up table 1133) for encoding and decoding may need to be available at both a wireless communication device 102 and its corresponding base station 112. One example of a Gray coding scheme is illustrated in Table (3) below. For convenience, only an example of a short Gray code is given. However, longer Gray coding sequences may be used in connection with the systems and methods disclosed herein. For the systems and methods herein, an ACK/NACK sequence may be indexed. The Gray code value may then be determined through the use of a look-up table.

TABLE (3)

| Index | Code |
|---|---|
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |
| 10 | 1111 |
| 11 | 1110 |
| 13 | 1010 |
| 14 | 1011 |
| 15 | 1001 |
| 16 | 1000 |

As illustrated in FIG. 12, a distribution shaping module 1135 may additionally or alternatively be used by the ACK/NACK balancing module 1106 to change the distribution of 1's and 0's of the ACK/NACK sequence 1148, 1170. The distribution shaping module 1135 may use a non-linear transformation to accomplish the balancing.

The distribution shaping module 1135 may use an algorithm 1137 and/or a look-up table 1139 to perform the distribution shaping. The algorithm 1137 and/or look-up table 1139 may be part of the distribution shaping information 1188. For example, the distribution shaping information 1188 may be generated on either a wireless communication device 102 or its corresponding base station 112. The algorithm 1137 and/or look-up table 1139 may be needed at both and/or communicated between the wireless communication device 102 (e.g., UE) and the base station 112 (e.g., eNB).

More detail on one example of distribution shaping follows. As discussed above, an ACK/NACK sequence 1148, 1170 may include many more 1's than 0's. A non-linear algorithm 1137 or look-up table 1139 may be used by the distribution shaping module 1135 to make the number of 1's and 0's closer to equal. One example of a non-linear function or algorithm is a Bernoulli code. The Bernoulli code may be expressed as Bern($\delta$) code. The term Bern($\delta$) may refer to a binary code whose bits are distributed as in a Bernoulli distribution with probability $\delta$. In a Bernoulli distribution with probability $\delta$, the probability that the r-th bit in an ACK/NACK sequence 1148, 1170 is 0 is $\delta$ and the probability that the r-th bit in the ACK/NACK sequence 1148, 1170 is 1 is 1−$\delta$. The ACK/NACK sequence 1148, 1170 may be encoded using a Bern($\frac{1}{2}$) code. In a Bern($\frac{1}{2}$) code, the probability that each bit is 0 is equal to the probability that each bit is 1 which is equal to $\frac{1}{2}$. Thus, the Bern($\delta$) code may be used by the distribution shaping module to make the number of 1's and 0's closer to equal.

As mentioned above, a look-up table 1139 may also be used by the distribution shaping module. For convenience, Table (4) below gives a short example of a lookup table that might be used by the distribution shaping module 1135 to shape the distribution of a seven bit ACK/NACK sequence 1148, 1170 into a "more balanced" five bit output. Table (4) also illustrates that compression and balancing may be done in a single mapping. In one example, a ten bit uncoded ACK/NACK sequence illustrated in Table (2) may be mapped directly to a "more balanced" five bit output in Table (4). Larger look-up tables with longer sequences may be used according to the systems and methods disclosed herein.

TABLE (4)

| Seven Bit ACK/NACK Sequence | Index | "More Balanced" Five Bit Output |
|---|---|---|
| 1100001 | 1 | 00000 |
| 1100011 | 2 | 00011 |
| 1100101 | 3 | 00111 |
| 1100111 | 4 | 01010 |
| 1101001 | 5 | 01100 |
| 1101011 | 6 | 01110 |
| 1101101 | 7 | 01111 |
| 1101111 | 8 | 10011 |
| 1110001 | 9 | 10101 |
| 1110011 | 10 | 10110 |
| 1110101 | 11 | 11000 |
| 1110111 | 12 | 11010 |
| 1111001 | 13 | 11100 |
| 1111011 | 14 | 11101 |
| 1111101 | 15 | 11110 |
| 1111111 | 16 | 11111 |

Thus, the ACK/NACK balancing module 1106 may use scrambling 1121, Gray coding 1129 and/or distribution shaping 1135 in order to generate a balanced 1189 or balanced compressed 1172 ACK/NACK sequence 1172 from an uncoded 1148 or compressed 1170 ACK/NACK sequence.

Figure 13:
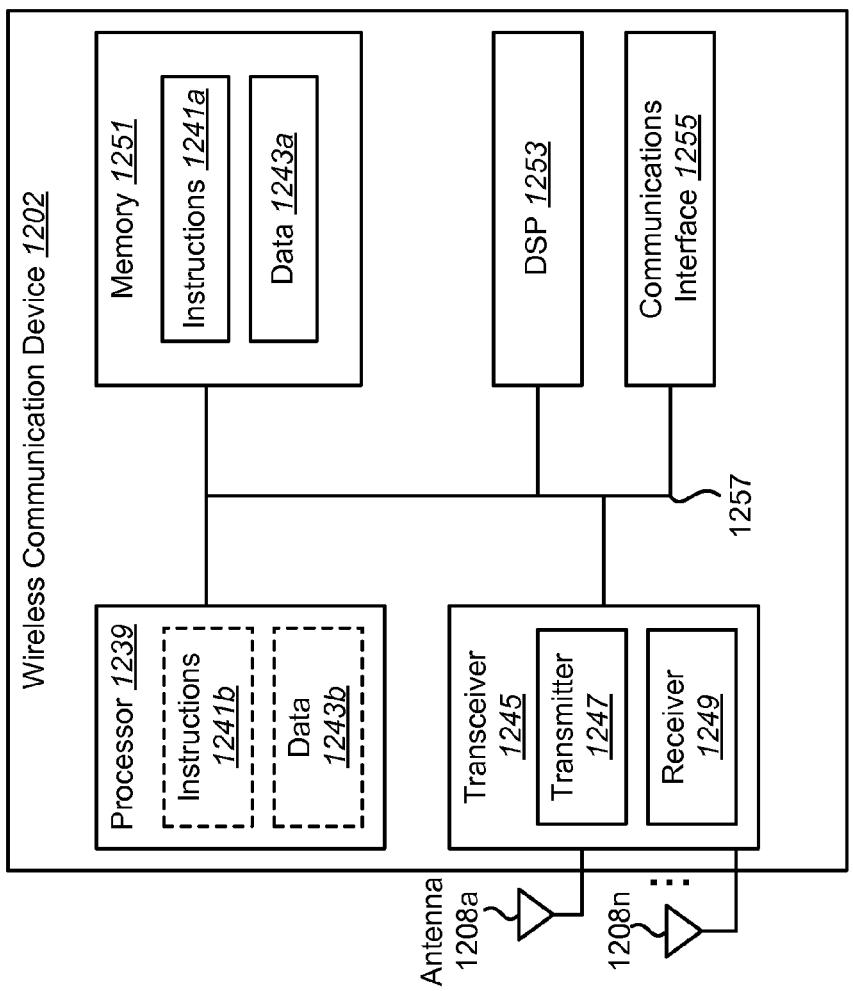
FIG. 13 illustrates various components that may be utilized in a wireless communication device.

FIG. 13 illustrates various components that may be utilized in a wireless communication device 1202. The wireless communication device 1202 may be utilized as the wireless communication device 102 in FIG. 1. The wireless communication device 1202 includes a processor 1239 that controls operation of the wireless communication device 1202. The processor 1239 may also be referred to as a CPU. Memory 1251, which may include both read-only memory (ROM), random access memory (RAM) or any type of device that may store information, provides instructions 1241a and data 1243a to the processor 1239. A portion of the memory 1251 may also include non-volatile random access memory (NVRAM). Instructions 1241b and data 1243b may also reside in the processor 1239. Instructions 1241b loaded into the processor 1239 may also include instructions 1241a from memory 1251 that were loaded for execution by the processor 1239. The instructions 1241b may be executed by the processor 1239 to implement the systems and methods disclosed herein.

The wireless communication device 1202 may also include a housing that contains a transmitter 1247 and a receiver 1249 to allow transmission and reception of data. The transmitter 1247 and receiver 1249 may be combined into a transceiver 1245. One or more antenna 1208a-n are attached to the housing and electrically coupled to the transceiver 1245.

The various components of the wireless communication device 1202 are coupled together by a bus system 1257 which may include a power bus, a control signal bus, and a status signal bus, in addition to a data bus. However, for the sake of clarity, the various buses are illustrated in FIG. 13 as the bus system 1257. The wireless communication device 1202 may also include a digital signal processor (DSP) 1253 for use in processing signals. The wireless communication device 1202 may also include a communications interface 1255 that provides user access to the functions of the wireless communication device 1202. The wireless communication device 1202 illustrated in FIG. 13 is a functional block diagram rather than a listing of specific components.

Figure 14:
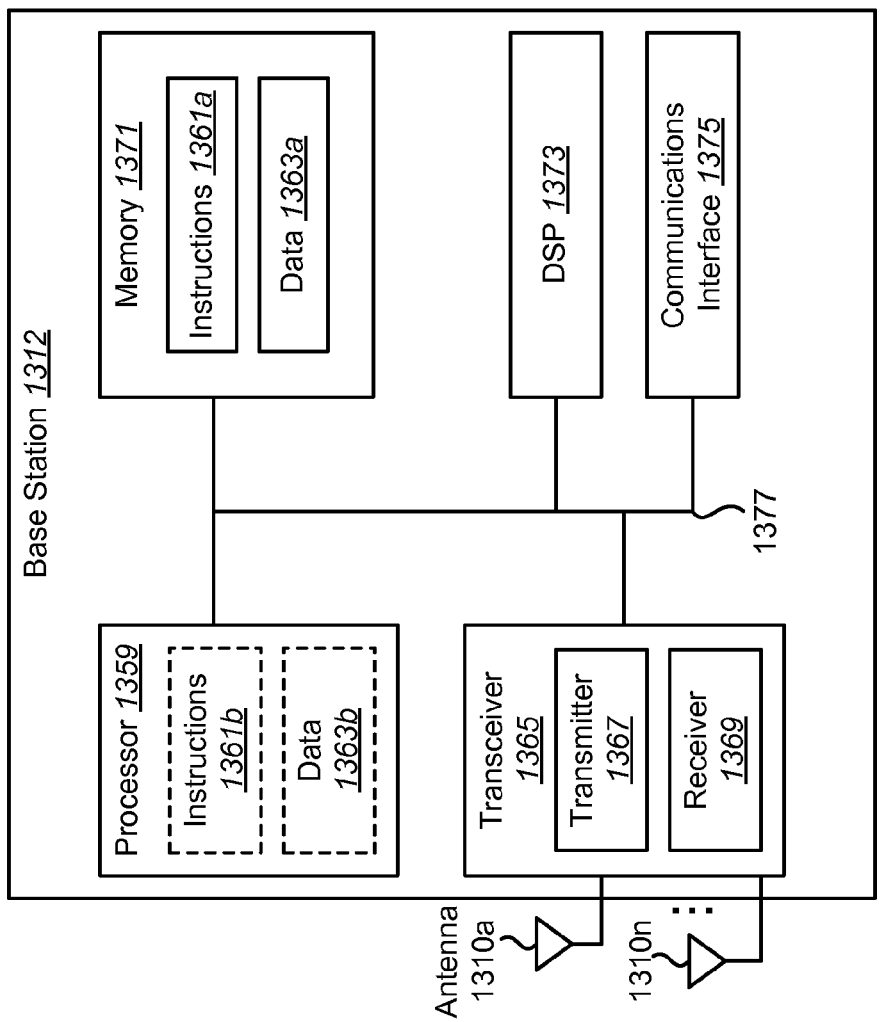
FIG. 14 illustrates various components that may be utilized in a base station.

FIG. 14 illustrates various components that may be utilized in a base station 1312. The base station 1312 may be utilized as the base station 112 in FIG. 1. The base station 1312 may include components that are similar to the components discussed above in relation to the wireless communication device 1202, including a processor 1359, memory 1371 that provides instructions 1361a and data 1363a to the processor 1359, instructions 1361b and data 1363b that may reside in the processor 1359, a housing that contains a transmitter 1367 and a receiver 1369 (which may be combined into a transceiver 1365), one or more antennas 1310a-n electrically coupled to the transceiver 1365, a bus system 1377, a DSP 1373 for use in processing signals, a communications interface 1375, and so forth.

The term "computer-readable medium" or "processor-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, a processor-readable medium may similarly comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another, combined into a single step or incorporated into other ancillary aspects of the communication system without departing from the scope of the claims. For example, channel decoding at the receiver may subsume source compression Gray decoding, distribution de-shaping and/or descrambling functions. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device configured for compression and transmission of Acknowledgement and Negative Acknowledgement (ACK/NACK), comprising:
    a processor;
    memory in electronic communication with the processor;
    instructions stored in the memory, the instructions being executable to:
        determine one or more thresholds based on a size of one or more code words;
        generate a compressed ACK/NACK sequence, wherein:
            the compressed ACK/NACK sequence identifies one or more correctly received code words and one or more incorrectly received code words if the number of incorrectly received code words is less than a first threshold of the one or more thresholds; and
            the compressed ACK/NACK sequence indicates that all of the one or more code words were incorrectly received if the number of incorrectly received code words is greater than the first threshold;
    wherein the communication device is selected from the group consisting of a wireless communication device and a base station.

2. The communication device of claim 1, wherein the instructions are further executable to receive a signal including one or more code words.

3. The communication device of claim 1, wherein the instructions are further executable to transmit the compressed ACK/NACK sequence.

4. The communication device of claim 1, wherein the compressed ACK/NACK sequence identifies one or more correctly received code words and one or more incorrectly received code words if the number of incorrectly received code words is equal to the first threshold.

5. The communication device of claim 1, wherein the compressed ACK/NACK sequence indicates each incorrectly received code word and at least one correctly received code word as an incorrectly received code word if the number of incorrectly received code words is equal to the threshold.

6. The communication device of claim 1, wherein the instructions are further executable to:
    partition an uncoded ACK/NACK sequence; and
    generate a compressed ACK/NACK sequence for each partition, wherein each partition uses one of the one or more thresholds.

7. The communication device of claim 1, wherein one of the group consisting of stronger code and unequal error protection is applied to one or more ACK/NACK bits corresponding to one or more designated code words.

8. The communication device of claim 7, wherein the one or more designated code words carry more sensitive information than other code words.

9. The communication device of claim 7, wherein the one or more designated code words are larger than other code words.

10. The communication device of claim 1, wherein the instructions are further executable to communicate threshold information with at least one other communication device.

11. The communication device of claim 1, wherein the instructions are further executable to format the compressed ACK/NACK sequence such that an ACK/NACK bit is sent only at times corresponding to bit transitions.

12. The communication device of claim 1, wherein the status of only one code word is reported for two or more code words if a spectral correlation between channels corresponding to the two or more code words is greater than a spectral threshold.

13. The communication device of claim 1, wherein the status of only one code word is reported for two or more code words if a spatial correlation between channels corresponding to the two or more code words is greater than a spatial threshold.

14. The communication device of claim 1, wherein the instructions are further executable to channel code the compressed ACK/NACK sequence.

15. A communication device configured for balancing and transmission of Acknowledgement and Negative Acknowledgement (ACK/NACK), comprising:
    a processor;
    memory in electronic communication with the processor;
    instructions stored in the memory, the instructions being executable to:
        receive an ACK/NACK sequence;
        balance the ACK/NACK sequence, wherein balancing comprises modifying the ACK/NACK sequence such that the ACK/NACK sequence has a more even distribution of ones and zeros; and
        transmit the ACK/NACK sequence.

16. The communication device of claim 15, wherein the ACK/NACK sequence is balanced using a scrambling sequence that is specific to the communication device.

17. The communication device of claim 16, wherein the scrambling sequence is selected from the group consisting of a static scrambling sequence, a semi-dynamic scrambling sequence and a dynamic scrambling sequence.

18. The communication device of claim 15, wherein the ACK/NACK sequence is balanced using Gray coding.

19. The communication device of claim 18, wherein the Gray coding is based on one selected from the group consisting of an algorithm and a look-up table.

20. The communication device of claim 15, wherein the ACK/NACK sequence is balanced using distribution shaping using a non-linear transformation.

21. The communication device of claim 20, wherein the distribution shaping is based on one selected from the group consisting of an algorithm and a look-up table.

22. The communication device of claim 15, wherein the ACK/NACK sequence is a compressed ACK/NACK sequence.

23. The communication device of claim 15, wherein the instructions are further executable to channel code the ACK/NACK sequence.

24. The communication device of claim 15, further comprising channel coding, on the communication device, the ACK/NACK sequence.

25. A method for compression and transmission of Acknowledgement and Negative Acknowledgement (ACK/NACK), comprising:
    determining, on a communication device, one or more thresholds based on a size of one or more code words;
    generating, on the communication device, a compressed ACK/NACK sequence, wherein:
        the compressed ACK/NACK sequence identifies one or more correctly received code words and one or more incorrectly received code words if the number of incorrectly received code words is less than a first threshold of the one or more thresholds; and
        the compressed ACK/NACK sequence indicates that all of the one or more code words were incorrectly received if the number of incorrectly received code words is greater than the first threshold;
    wherein the communication device is selected from the group consisting of a wireless communication device and a base station.

26. The method of claim 25, further comprising receiving, by the communication device, a signal including one or more code words.

27. The method of claim 25, further comprising transmitting, from the communication device, the compressed ACK/NACK sequence.

28. The method of claim 25, wherein the compressed ACK/NACK sequence identifies one or more correctly received code words and one or more incorrectly received code words if the number of incorrectly received code words is equal to the first threshold.

29. The method of claim 25, wherein the compressed ACK/NACK sequence indicates each incorrectly received code word and at least one correctly received code word as an incorrectly received code word if the number of incorrectly received code words is equal to the first threshold.

30. The method of claim 25, further comprising:
    partitioning, on the communication device, an uncoded ACK/NACK sequence; and
    generating, on the communication device, a compressed ACK/NACK sequence for each partition, wherein each partition uses one of the one or more thresholds.

31. The method of claim 25, wherein one of the group consisting of stronger code and unequal error protection is applied to one or more ACK/NACK bits corresponding to one or more designated code words.

32. The method of claim 31, wherein the one or more designated code words carry more sensitive information than other code words.

33. The method of claim 31, wherein the one or more designated code words are larger than other code words.

34. The method of claim 25, further comprising communicating threshold information with at least one other communication device.

35. The method of claim 25, further comprising formatting, on the communication device, the compressed ACK/NACK sequence such that an ACK/NACK bit is sent only at times corresponding to bit transitions.

36. The method of claim 25, wherein the status of only one code word is reported for two or more code words if a spectral correlation between channels corresponding to the two or more code words is greater than a spectral threshold.

37. The method of claim 25, wherein the status of only one code word is reported for two or more code words if a spatial correlation between channels corresponding to the two or more code words is greater than a spatial threshold.

38. The method of claim 25, further comprising channel coding, on the communication device, the compressed ACK/NACK sequence.

39. The method of claim 25, wherein the communication device is selected from the group consisting of a wireless communication device and a base station.

40. A method for balancing and transmission of Acknowledgement and Negative Acknowledgement (ACK/NACK), comprising:
    receiving, by a communication device, an ACK/NACK sequence;
    balancing, on the communication device, the ACK/NACK sequence, wherein balancing comprises modifying the ACK/NACK sequence such that the ACK/NACK sequence has a more even distribution of ones and zeros; and
    transmitting the ACK/NACK sequence from the communication device.

41. The method of claim 40, wherein the ACK/NACK sequence is balanced using a scrambling sequence that is specific to the communication device.

42. The method of claim 41, wherein the scrambling sequence is selected from the group consisting of a static scrambling sequence, a semi-dynamic scrambling sequence and a dynamic scrambling sequence.

43. The method of claim 40, wherein the ACK/NACK sequence is balanced using Gray coding.

44. The method of claim 43, wherein the Gray coding is based on one selected from the group consisting of an algorithm and a look-up table.

45. The method of claim 40, wherein the ACK/NACK sequence is balanced using distribution shaping using a non-linear transformation.

46. The method of claim 45, wherein the distribution shaping is based on one selected from the group consisting of an algorithm and a look-up table.

47. The method of claim 40, wherein the ACK/NACK sequence is a compressed ACK/NACK sequence.

48. A non-transitory tangible computer-readable medium for compression and transmission of Acknowledgement and Negative Acknowledgement (ACK/NACK) comprising executable instructions for:
    determining, on a communication device, one or more thresholds based on a size of one or more code words;
    generating, on the communication device, a compressed ACK/NACK sequence, wherein:
        the compressed ACK/NACK sequence identifies one or more correctly received code words and one or more incorrectly received code words if the number of incorrectly received code words is less than a first threshold of the one or more thresholds; and
        the compressed ACK/NACK sequence indicates that all of the one or more code words were incorrectly received if the number of incorrectly received code words is greater than the first threshold;

wherein the communication device is selected from the group consisting of a wireless communication device and a base station.

49. A non-transitory tangible computer-readable medium for balancing and transmission of Acknowledgement and Negative Acknowledgement (ACK/NACK) comprising executable instructions for:
receiving an ACK/NACK sequence;
balancing the ACK/NACK sequence, wherein balancing comprises modifying the ACK/NACK sequence such that the ACK/NACK sequence has a more even distribution of ones and zeros; and
transmitting the ACK/NACK sequence.

* * * * *